(12) United States Patent
Koseki et al.

(10) Patent No.: US 8,004,590 B2
(45) Date of Patent: Aug. 23, 2011

(54) SOLID-STATE IMAGING DEVICE, PIXEL-SIGNAL PROCESSING METHOD, ANALOG-SIGNAL TRANSFERRING DEVICE, AND ANALOG-SIGNAL TRANSFERRING METHOD

(75) Inventors: Ken Koseki, Kanagawa (JP); Tsutomu Haruta, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/685,127

(22) Filed: Jan. 11, 2010

(65) Prior Publication Data

US 2010/0110249 A1    May 6, 2010

Related U.S. Application Data

(60) Continuation of application No. 12/240,214, filed on Sep. 29, 2008, now Pat. No. 7,719,586, which is a division of application No. 10/963,265, filed on Oct. 12, 2004, now Pat. No. 7,508,433.

(30) Foreign Application Priority Data

Oct. 15, 2003 (JP) ................................ 2003-354888
Aug. 24, 2004 (JP) ................................ 2004-243551

(51) Int. Cl.
*H04N 3/14* (2006.01)
*H04N 5/335* (2006.01)
(52) U.S. Cl. ...................... 348/300; 348/308; 250/208.1
(58) Field of Classification Search .................. None
See application file for complete search history.

(56) References Cited

U.S. PATENT DOCUMENTS

| | | | | |
|---|---|---|---|---|
| 5,610,403 A | * | 3/1997 | Kingsley et al. | 250/370.09 |
| 5,659,355 A | * | 8/1997 | Barron et al. | 348/245 |
| 5,731,578 A | | 3/1998 | Mizuno | |
| 5,736,886 A | * | 4/1998 | Mangelsdorf et al. | 327/310 |
| 5,757,440 A | * | 5/1998 | Mangelsdorf | 340/573.4 |
| 5,892,540 A | | 4/1999 | Kozlowski et al. | |
| 6,201,573 B1 | | 3/2001 | Mizuno | |
| 6,587,143 B1 | * | 7/2003 | Boisvert | 348/241 |
| 6,686,959 B1 | | 2/2004 | Ducourant et al. | |
| 6,747,700 B1 | | 6/2004 | Funakoshi et al. | |
| 6,791,607 B1 | * | 9/2004 | Bilhan et al. | 348/243 |
| 6,829,007 B1 | * | 12/2004 | Bilhan et al. | 348/243 |
| 7,417,675 B2 | * | 8/2008 | Loose | 348/243 |
| 7,671,914 B2 | * | 3/2010 | Ang | 348/308 |

(Continued)

FOREIGN PATENT DOCUMENTS

JP         08-186764           7/1996

(Continued)

*Primary Examiner* — Lin Ye
*Assistant Examiner* — Dennis Hogue
(74) *Attorney, Agent, or Firm* — SNR Denton US LLP

(57) ABSTRACT

From a pixel array where imaging pixels are arranged, pixel signals of respective columns on a selected row are read in parallel in a horizontal blanking period of a horizontal period. The pixel signals of the respective columns are output to horizontal signal lines in an effective period of the horizontal period via charge integrating amps provided respectively for the columns, i.e., provided respectively for vertical signal lines, and are thereby transferred horizontally. In the charge integrating amps, it is possible to enter a standby state while holding the pixel signals by a holding voltage. Furthermore, in the charge integrating amps, a reference potential for precharging feedback capacitors for amps at the time of a reading operation is automatically controlled based on a black level. Furthermore, pixel signals from the respective charge integrating amps are horizontally transferred in parallel using a plurality of horizontal signal lines.

1 Claim, 19 Drawing Sheets

U.S. PATENT DOCUMENTS

| | | |
|---|---|---|
| 2002/0134918 A1 | 9/2002 | Miida |
| 2002/0179712 A1 | 12/2002 | Yahagi et al. |
| 2003/0164887 A1 | 9/2003 | Koizumi et al. |
| 2003/0202111 A1* | 10/2003 | Park .............................. 348/243 |
| 2004/0080637 A1* | 4/2004 | Nakamura et al. ............ 348/255 |
| 2004/0085465 A1 | 5/2004 | Inui et al. |
| 2004/0099920 A1* | 5/2004 | Rossi et al. ................... 257/448 |
| 2004/0207739 A1 | 10/2004 | Rossi |
| 2005/0231620 A1 | 10/2005 | Fraenkel et al. |
| 2007/0247533 A1 | 10/2007 | Hisamatsu et al. |

FOREIGN PATENT DOCUMENTS

| | | |
|---|---|---|
| JP | 08-331459 | 12/1996 |
| JP | 09-051476 | 2/1997 |
| JP | 10-023336 | 1/1998 |
| JP | 11-266399 | 9/1999 |
| JP | 2000-287130 | 10/2000 |
| WO | WO 9966709 A2 * | 12/1999 |

* cited by examiner

Prior Art FIG. 17
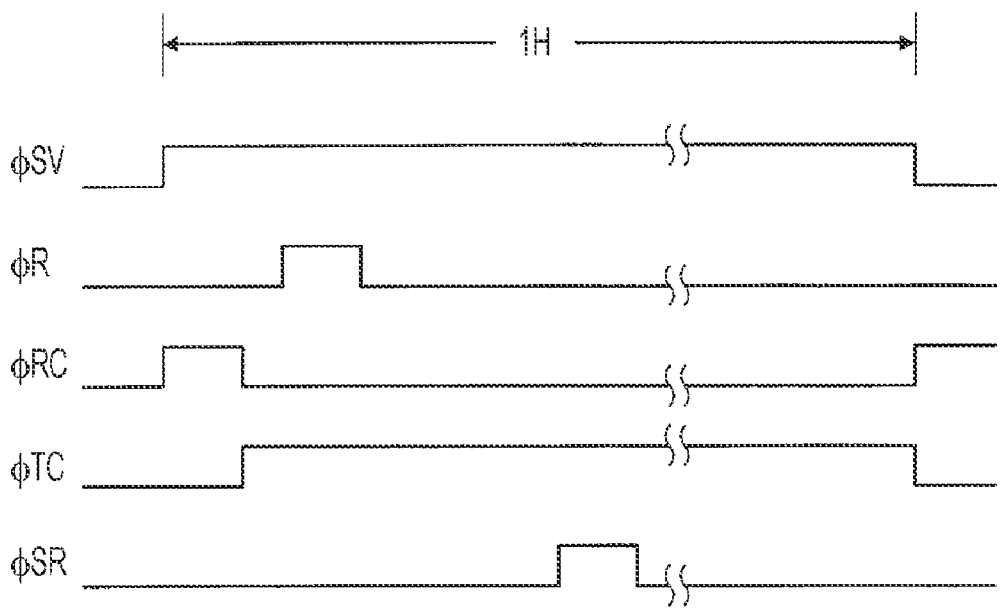
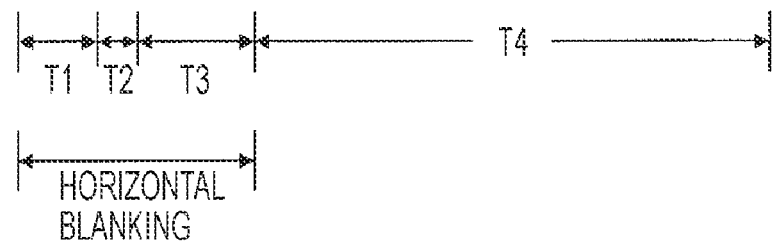
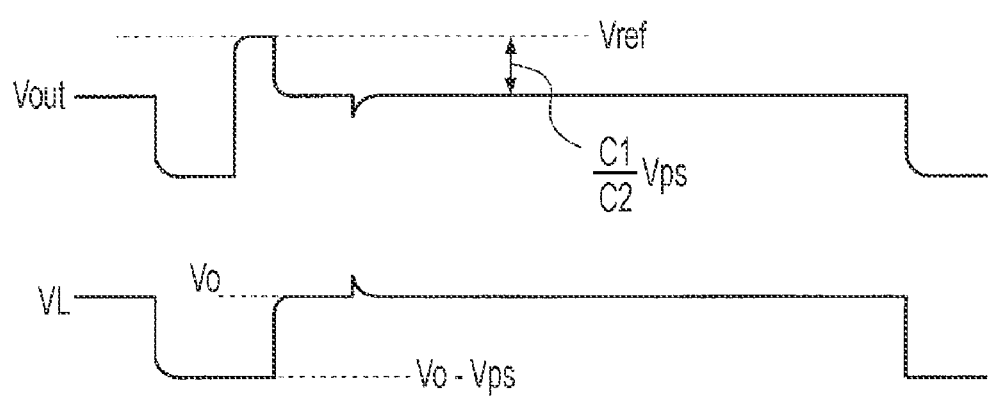

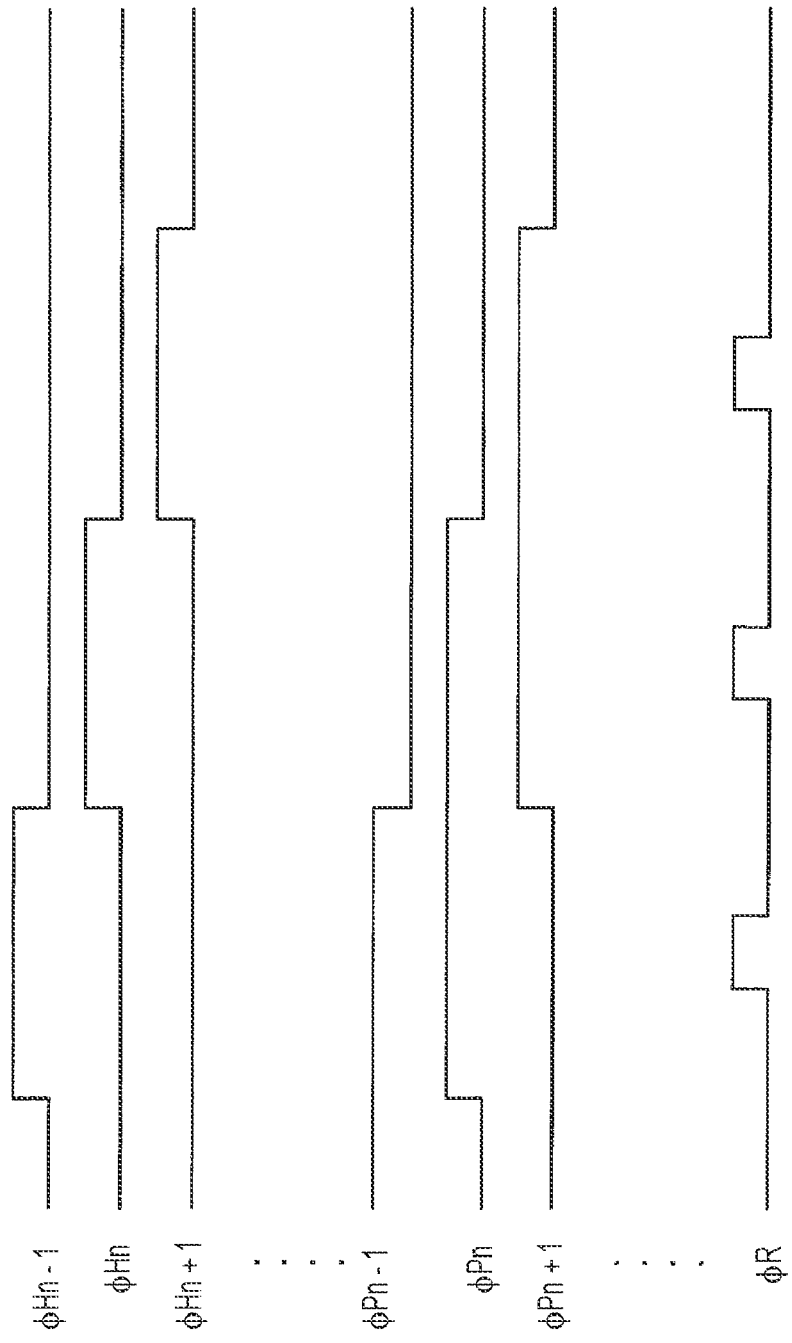

SOLID-STATE IMAGING DEVICE, PIXEL-SIGNAL PROCESSING METHOD, ANALOG-SIGNAL TRANSFERRING DEVICE, AND ANALOG-SIGNAL TRANSFERRING METHOD

RELATED APPLICATION DATA

This application is a continuation of U.S. patent application Ser. No. 12/240,214, filed Sep. 29, 2008, which is a division of U.S. patent application Ser. No. 10/963,265, filed Oct. 12, 2004, the entireties of both of which are incorporated herein by reference to the extent permitted by law. The present invention claims priority to Japanese Patent Application Nos. 2003-354888 filed in the Japanese Patent Office on Oct. 15, 2003, and 2004-243551filed in the Japanese Patent Office on Aug. 24, 2004, the entireties of both of which are incorporated by reference herein to the extent permitted by law.

BACKGROUND OF THE INVENTION

1. Field of the Invention

The present invention relates to a solid-state imaging device, a pixel-signal processing method for a solid-state imaging device, an analog-signal transferring device, and an analog-signal transferring method.

2. Description of the Related Art

Recently, as an alternative to CCD image sensors, interest in CMOS image sensors has arisen. This is because CMOS image sensors overcome various problems of CCD image sensors. The problems of CCD image sensors include, for example, the problem that CCD requires special processes for manufacturing, the problem that a plurality of power supply voltages is needed for operation thereof, and the problem that the system is very complex since a plurality of peripheral ICs must be used in combination.

CMOS image sensors can be manufactured by the same manufacturing processes as ordinary CMOS integrated circuits that are manufactured around the world. Furthermore, CMOS image sensors can be driven by a singe power source. Furthermore, it is possible to combine analog circuits and logic circuits manufactured by CMOS processes in a single chip, so that the number of peripheral ICs can be reduced. These are considerable merits for the CMOS image sensors.

The mainstream of output circuits for CCDs is one-channel output using a floating diffusion (FD) amp. In contrast, the mainstream of CMOS image sensors is of the type having FD amps for respective pixels and having column-parallel outputs, i.e., one row of a pixel array is selected and pixels on the selected row are simultaneously read out in a column direction. In this type of CMOS image sensors, it is difficult to obtain sufficient driving ability with the FD amps provided in the pixels, so that the data rate must be decreased, for which parallel processing is advantageous.

Various arrangements of a signal output circuit for the parallel-output CMOS image sensors have been proposed. As an example, outputs of pixels are sampled by switched capacitors to read the outputs. As another example, signals are read by amps provided for the respective columns. As yet another example, AD converters and DRAMs are also provided for the respective columns. The present invention mainly relates to a scheme of reading by amps provided for the respective columns.

Japanese Unexamined Patent Application Publication No. 5-207220 describes an example of the scheme of reading by amps provided for the respective columns, which will be briefly described with reference to FIGS. 16 and 17.

In, FIG. 16, one column (circuitry of one vertical signal line VL) associated with one pixel 102 is shown as extracted. The pixel 102 is formed by a photodiode PD, a reset transistor Trst, an amplifying transistor Tg, and a reading transistor Ts. In this case, the output of the pixel 102 is read using a charge integrating amp formed by a source-grounded amp 100 and capacitors C1 and C2.

It is to be particularly noted that the feedback capacitor C2 is adapted to be precharged by a switch Tr15 and a reference voltage Vref so that offset variation among the source-grounded amps 100 is removed.

FIG. 17 shows an operation timing chart of the circuit. In a period T1 in a horizontal blanking period, a value obtained by superposing a signal Vps on an offset voltage Vo is output. The charge integrating amp is reset with a switch Tr13 turned off by a signal φRC. At this time, the switch Tr15 is turned on by the signal φRC, and the switch Tr14 is turned off by a signal φTC, so that the capacitor C2 is precharged to the reference voltage Vref.

Then, in a period T2, the switch Tr15 is turned off and the switch Tr14 is turned on by the signals φRC and φTC, so that the precharged reference voltage Vref appears on the output of the charge integrating amp. Since the switch Tr13 is turned off simultaneously with the switch Tr15, the reset state is exited.

Then, in a period T3, only the offset voltage Vo is output from the pixel 102, and the output is integrated, so that only the signal component is read at the output of the charge integrating amp with a gain determined by the capacitance ratio of the capacitors C1 and C2.

The signals that are read last are sequentially output to the horizontal signal lines HL in synchronization with pulses supplied from a shift register 101.

As described above, according to the scheme of reading by amps provided for the respective columns, it is readily possible to remove an offset voltage of pixels and to extract only signal components, and the gain of reading can be set arbitrarily by the capacitance ratio of the capacitors C1 and C2. Furthermore, variation of source follower can be removed by precharging of the reference voltage Vref. As described above, the scheme has various advantages.

Japanese Unexamined Patent Application Publication No. 11-266399 describes another scheme of reading, which will be described with reference to FIGS. 18 and 19.

In FIG. 17, three columns (vertical signal lines VL1, VLn, and VLN) that are arbitrarily selected are shown as extracted. Furthermore, as a pixel 200 formed by a photodiode PD and a reading transistor Ts, a pixel associated with a selecting line Vs is shown. In this case, when the selecting line Vs is selected by a vertical scanning circuit 201, pixels on one row are selected, and signals from the respective pixels are output to the respective columns (the respective vertical signal lines VL).

This example is similar to the example described in Japanese Unexamined Patent Application Publication No. 5-207220 in that amps 203 are provided for the respective columns (the respective vertical signal lines VL). It is to be particularly noted, however, that standby controlling signals φP (φP1, φPn, and φPN) are supplied from a horizontal scanning circuit 202 to the respective amps 203. Thus, the amps 203 are allowed to shift between a standby state and an active state on a column-by-column basis.

The outputs of the respective amps 203 are selected by switches 204, and are transferred to an output terminal 205 via horizontal signal lines HL. The switches 204 are respectively controlled to turn on or off by signals φH (φH1, φHn, and φHN) from the horizontal scanning circuit 202.

FIG. 19 shows an operation timing chart.

An amp 203 is selected by a pulse of the signal φHN, and a signal is read in that period. As opposed to the example described in Japanese Unexamined Patent Application Publication No. 5-207220, signals are not read at once in a horizontal blanking period, but signals are respectively read in periods selected according to the signals φHN, so that operation is not needed in periods not selected according to the signals φHN. That is, amps 203 that are not selected are allowed to stay in the standby state.

Considering that it takes some time for the amps 203 to return from the standby state, standby control signals φPn are caused to rise somewhat earlier than the signals φHn, but the amps are in the standby state in other periods so that currents do not flow. Thus, for example, assuming a sensor (pixel array) having 1,000 columns and the amps 203 provided for the respective columns, a current actually flows only in one amp, or two amps in the example shown in FIG. 19 considering overlapping of the signals φPn. Thus, advantageously, power consumption is very low.

The related art described in Japanese Unexamined Patent Application Publication No. 5-207220 and Japanese Unexamined Patent Application Publication No. 11-266399 have the following problems.

According to Japanese Unexamined Patent Application Publication No. 5-207220, since amps must be provided for the respective columns, power consumption inevitably increases. Particularly in this example, horizontal signal lines HL must be driven directly, and for example, in the case of a sensor having 1,000 columns, the time that can be used to drive the horizontal signal lines HL is limited to 1/1,000 of an effective period of a horizontal period, so that operation at a very high speed is required. This causes increase in operation current per one amp among the amps provided for the respective columns, causing additional increase in power consumption.

Furthermore, although the reference voltage Vref essentially determines the black level of signals, since a fixed potential is used, tracking ability to variation factors such as temperature change or power supply voltage is not provided. Thus, a clamp circuit is needed at a subsequent stage in order to supply a stable black level, causing increase in circuitry scale.

According to Japanese Unexamined Patent Application Publication No. 11-266399, although power consumption is decreased, as described earlier, pixel signals must be read and horizontally transferred in the periods of the signals φHn. Thus, compared with the example described in Japanese Unexamined Patent Application Publication No. 5-207220, the amps must operate at a very high speed, causing increase in current that flows per one amp. Furthermore, the layout area of the amps increases, which is very disadvantageous considering the restriction that the amps must be laid out respectively for the vertical signal lines from the imaging pixel array, i.e., for the respective columns, so that difficulty is design is expected.

SUMMARY OF THE INVENTION

In view of the situation described above, it is an object of the present invention to provide a favorable solid-state imaging device and a pixel-signal processing method, i.e., to provide a circuit that gives tracking ability for a black level at low power consumption without causing increase in layout area in an arrangement in which charge integrating amps are provided for the respective columns. It is another object of the present invention to provide a favorable analog-signal transferring device and analog-signal transferring method.

The present invention, in one aspect thereof, provides a solid-state imaging device including an imaging pixel region where a plurality of imaging pixels is disposed; a vertical selecting circuit for outputting pixel signals from imaging pixels of respective columns on a selected row of the imaging pixel region to vertical signal lines provided respectively for the columns; charge integrating amps provided respectively for the vertical signal lines of the columns so as to receive inputs of pixel signals from imaging pixels of the respective columns; holding elements that allow pixel signals input, for example, in a horizontal blanking period to be held in the charge integrating amps even in periods when the charge integrating amps are in a standby state; and a horizontal selecting circuit for transferring pixel signals output from the respective charge integrating amps by a horizontal signal line.

The holding elements may be implemented by circuits that fix outputs of the charge integrating amps to a predetermined holding voltage.

Preferably, the horizontal selecting circuit allows the charge integrating amps to be switched individually between an ON state and the standby state according to amp controlling signals supplied respectively to the charge integrating amps, and allows the charge integrating amps to be connected individually to the horizontal signal line according to amp selecting signals for connecting the respective charge integrating amps to the horizontal signal line, and the charge integrating amps provided for the respective columns are sequentially turned on for a predetermined period and are connected to the horizontal signal line so that pixel signals output from the respective charge integrating amps are sequentially output to the horizontal signal line.

The horizontal selecting circuit may output the amp controlling signals and the amp selecting signals as common signals.

The charge integrating amps may have feedback capacitors implemented by variable capacitors.

The present invention, in another aspect thereof, provides a solid-state imaging device including an imaging pixel region where a plurality of imaging pixels is disposed; a vertical selecting circuit for outputting pixel signals from imaging pixels of respective columns on a selected row of the imaging pixel region to vertical signal lines provided respectively for the columns; charge integrating amps provided respectively for the vertical signal lines of the columns so as to receive inputs of pixel signals from imaging pixels of the respective columns; a horizontal selecting circuit for transferring pixel signals output from the respective charge integrating amps by one or more horizontal signal lines; a reference-potential generating unit for generating a reference potential based on a black level of the pixel signals output through the horizontal signal lines; and charging elements for charging feedback capacitors of the charge integrating amps to the reference potential generated by the reference-potential generating unit, before pixel signals are read by the vertical selecting circuit.

The solid-state imaging device may further include holding elements that allow the input pixel signals to be held in the charge integrating amps even in periods when the charge integrating amps are in a standby state.

The feedback capacitors of the charge integrating amps may be implemented by variable capacitors.

The present invention, in another aspect thereof, provides a solid-state imaging device including an imaging pixel region where a plurality of imaging pixels is disposed; a vertical selecting circuit for outputting pixel signals from imaging pixels of respective columns on a selected row of the imaging pixel region to vertical signal lines provided respectively for the columns; amps such as charge integrating amps, provided respectively for the vertical signal lines of the columns so as to receive inputs of pixel signals from imaging pixels of the respective columns; a plurality of horizontal signal lines; and a horizontal selecting circuit for assigning pixel signals held by the amps of the respective columns to the plurality of horizontal signal lines so that the pixel signals are transferred by the plurality of horizontal signal lines.

The solid-state imaging device may further include a multiplexer for sequentially selecting the plurality of horizontal signal lines to generate serial data including output pixel signals based on the pixel signals transferred by the plurality of horizontal signal lines.

Preferably, shielding lines that are based on a reference potential of the multiplexer are provided between the plurality of horizontal signal lines.

The horizontal selecting circuit may transfer the outputs of the respective amps in such a manner that the outputs passing through the plurality of horizontal signal lines overlap each other with shifts of one clock period.

Preferably, the horizontal selecting circuit allows the amps to be switched individually between an ON state and a standby state according to amp controlling signals supplied respectively to the amps, and allows the amps to be connected individually to one of the plurality of horizontal signal lines according to amp selecting signals for connecting the respective charge integrating amps individually to a specific horizontal signal line among the plurality of horizontal signal lines, and the amps provided for the respective columns are sequentially turned on for a predetermined period and are connected to the horizontal signal lines so that pixel signals output from the respective amps are sequentially transferred by the plurality of horizontal signal lines.

The horizontal selecting circuit may output the amp controlling signals and the amp selecting signals as common signals. Alternatively, instead of using common signals, the horizontal selecting circuit may turn on the respective amps by the amp controlling signals before connecting the amps to the horizontal signal lines by the amp selecting signals.

Preferably, the horizontal selecting circuit includes a shift register, and pulse signals having a pulse width determined in accordance with the number of the horizontal signal lines and a data rate of the pixel signals output from the amps are input to the shift register to generate the amp selecting signals.

The horizontal selecting circuit may generate each of the amp controlling signals for the respective amps by taking logic OR of a pulse that functions as an amp selecting signal for a relevant amp and a pulse whose edge timing is advanced than an edge timing of the pulse. For example, the amp controlling signal for an n-th amp among the amps is generated by taking logic OR of an n-th amp selecting signal for the n-th amp and an (n−1)-th amp selecting signal for an (n−1)-th amp.

When the amps are charge integrating amps, preferably, the solid-state imaging device further includes a reference-potential generating unit for generating a reference potential based on a black level of the pixel signals output through the horizontal signal lines, and charging elements for charging feedback capacitors of the charge integrating amps to the reference potential generated by the reference-potential generating unit, before pixel signals are read by the vertical selecting circuit.

Alternatively, the solid-state imaging device may further include a reference-potential generating unit for generating a reference potential based on a black level of the pixel signals output through the horizontal signal lines, wherein the reference potential is used as a reference potential for an output amp of the multiplexer.

The solid-state imaging device may further include holding elements that allow the input pixel signals to be held in the amps even in periods when the amps are in a standby state.

When the amps are charge integrating amps, feedback capacitors of the charge integrating amps may be implemented by variable capacitors.

The present invention, in another aspect thereof, provides a pixel-signal processing method including a pixel-signal vertical transfer step of outputting pixel signals from imaging pixels of respective columns on a selected row of an imaging pixel region where a plurality of imaging signals is disposed to vertical signal lines provided respectively for the columns; a signal holding step of holding pixel signals by charge integrating amps provided respectively for the vertical signal lines of the columns; a standby step of causing the charge integrating amps to enter a standby state while holding the pixel signals; and a horizontal transfer step of sequentially turning on the charge integrating amps for a predetermined period so that the pixel signals held by the charge integrating amps are transferred by a horizontal signal line.

The present invention, in another aspect thereof, provides a pixel-signal processing method including a pixel-signal vertical transfer step of outputting pixel signals from imaging pixels of respective columns on a selected row of an imaging pixel region where a plurality of imaging signals is disposed to vertical signal lines provided respectively for the columns; a signal holding step of holding pixel signals by charge integrating amps provided respectively for the vertical signal lines of the columns; a horizontal transfer step of sequentially transferring the pixel signals held by the charge integrating amps by a horizontal signal line; a reference-potential generating step of generating a reference potential based on a black level of the pixel signals output through the horizontal signal line; and a charging step of charging feedback capacitors of the charge integrating amps to the reference potential generated in the reference-potential generating step, before pixel signals are read in the pixel-signal vertical transfer step.

The present invention, in another aspect thereof, provides a pixel-signal processing method including a pixel-signal vertical transfer step of outputting pixel signals from imaging pixels of respective columns on a selected row of an imaging pixel region where a plurality of imaging signals is disposed to vertical signal lines provided respectively for the columns; a signal holding step of holding pixel signals by amps provided respectively for the vertical signal lines of the columns; and a horizontal transfer step of assigning the pixel signals held by the amps of the respective columns to a plurality of horizontal signal lines so that the pixel signals are transferred by the plurality of horizontal signal lines.

According to the solid-state imaging devices and pixel signal processing methods described above, pixel signals of columns on a selected row are read from an imaging pixel region (pixel array) where a plurality of imaging pixels is arranged. The pixel signals are read in parallel in a horizontal blanking period of a horizontal period. The pixel signals of the respective columns are output in an effective period of the horizontal period to the horizontal signal lines via the charge integrating amps and are then horizontally transferred.

The above aspects of the present invention have the following main features regarding reading of pixel signals of the respective columns in parallel:

(1) Charge integrating amps provided for the respective columns enter the standby state while holding pixel signals that are read in a horizontal blanking period.

(2) In charge integrating amps provided for the respective columns, the reference potential for precharging feedback capacitors of amps at the time of a reading operation is automatically controlled based on the black level.

(3) Pixel signals are horizontally transferred from the respective charge integrating amps using a plurality of horizontal signal lines HL in parallel, so that the data rate per one horizontal signal line is reduced.

The present invention, in another aspect thereof, provides an analog-signal transferring device including an analog-signal holding unit including signal holding elements for holding analog signals, the signal holding elements being arranged along one or more rows; amps for reading signal values of the signal holding elements, provided for respective columns of the analog-signal holding unit; a plurality of horizontal signal lines; and a horizontal selecting circuit for assigning outputs of the amps to the plurality of horizontal signal lines so that the outputs are transferred by the plurality of horizontal signal lines; wherein the horizontal selecting circuit transfers the outputs of the amps in such a manner that the outputs passing through the plurality of horizontal signal lines overlap each other with shifts of one clock period.

The present invention, in another aspect thereof, provides an analog-signal transferring method including a vertical transfer step of outputting analog signals from an analog-signal holding unit to vertical signal lines provided for respective columns, the analog-signal holding unit including signal holding elements for holding analog signals, the signal holding elements being arranged along one or more rows; a signal holding step of holding analog signals by amps provided for the vertical signal lines of the respective columns; and a horizontal transfer step of assigning the analog signals held by the respective amps to a plurality of horizontal signal lines so that the analog signals are transferred by the plurality of horizontal signal lines at such timings that the analog signals overlap each other with shifts of one clock period.

According to the analog-signal transferring device and the analog-signal transferring method, since analog signals from the respective amps are transferred horizontally using a plurality of horizontal signal lines in parallel, the data rate per one horizontal signal line can be decreased.

The present invention, in another aspect thereof, provides a solid-state imaging device further including a chip for processing signals output through the horizontal signal line or horizontal signal lines.

BRIEF DESCRIPTION OF THE DRAWINGS

FIG. 17 is a diagram showing operation timing according to the first related art;

FIG. 19 is a diagram showing operation timing according to the second related art.

DESCRIPTION OF THE PREFERRED EMBODIMENTS

Now, solid-state imaging devices and pixel-signal processing methods according to first to sixth embodiments of the present invention will be described.

First Embodiment

Figure 1:
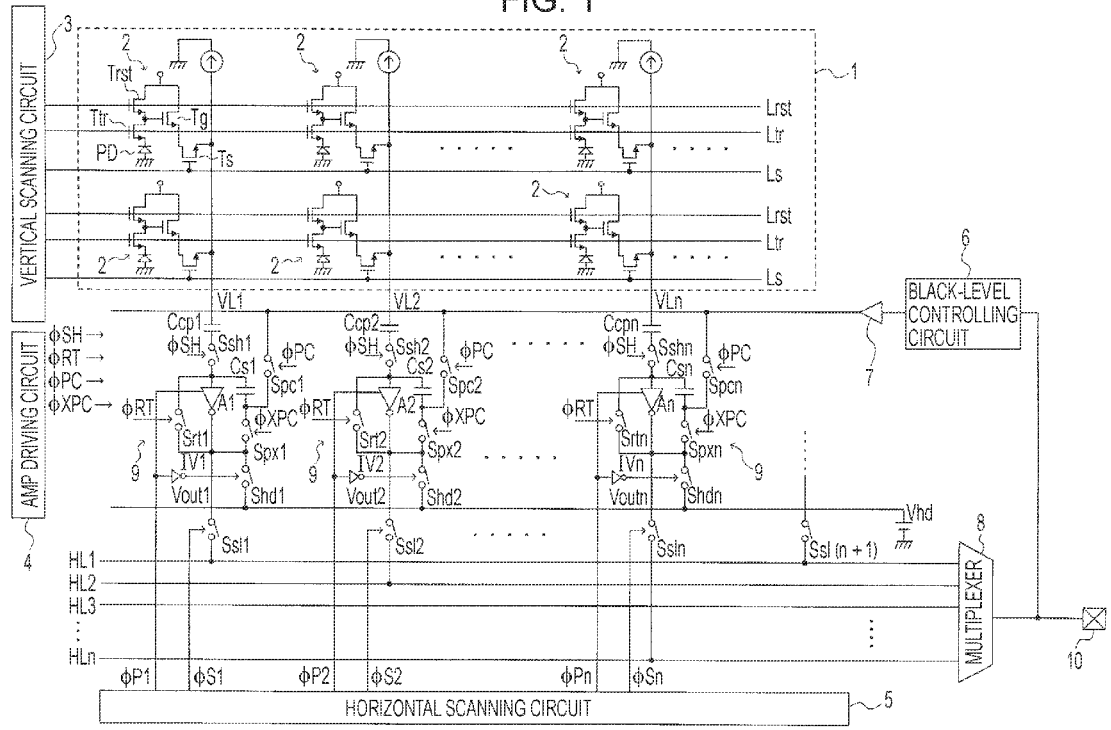
FIG. 1 is a diagram showing a construction according to a first embodiment of the present invention.

FIG. 1 shows a construction according to a first embodiment of the present invention. The circuit shown in FIG. 1 allows pixel signals obtained by a pixel array 1 in a solid-state imaging device to be output from an output terminal 10. A lens system for forming a path of light incident on the pixel array 1 and a signal processing system provided at a subsequent stage of the output terminal 10 are not shown, and descriptions thereof will be omitted.

The pixel array 1 includes a large number of imaging pixels 2 arranged in a row direction and a column direction. Each of the pixels 2 is formed by a photodiode PD, a transferring transistor Ttr, a reset transistor Trst, an amplifying transistor Tg, and a selecting transistor Ts, connected as shown in FIG. 1.

The selecting transistors Ts of the imaging pixels 2 on each column of the pixel array 1 are commonly connected to a vertical signal line VL (VL1, VL2, . . . VLn).

Furthermore, in order to allow common control for reading from the imaging pixels 2 on each row, a set of reset control line Lrst, a transfer control line Ltr, and a select control line Ls is provided for each row of the pixel array 1. Each of the reset control line Lrst, the transfer control line Ltr, and the select control line Ls receives control pulses from a vertical scanning circuit 3 at specific timings.

With regard to each of the imaging pixels, the gate of the reset transistor Trst is connected to the associated reset control line Lrst, the gate of the transferring transistor Ttr is connected to the associated transfer control line Ltr, and the gate of the selecting transistor Ts is connected to the associated select control line Ls.

The vertical scanning circuit 3 sequentially selects the rows of the pixel array 1 so that pixel signals are read by the vertical signal lines VL. As will be described later in more detail, with regard to each row of the pixel array 1, the vertical scanning circuit 3 applies pulses to the reset control line Lrst and the select control line Ls so that a reset level is supplied to the vertical signal lines VL. The vertical scanning circuit 3 also applies pulses to the transfer control line Ltr and the select control line Ls so that pixel signals corresponding to charges accumulated in photodiodes PD are supplied to the vertical signal lines VL. The vertical scanning circuit 3 sequentially executes the reading operation described above for each of the rows of the imaging pixels 2.

Pixel signals of the imaging pixels 2 on a single selected row are read in a horizontal blanking period of one horizontal period. That is, in the horizontal blanking period, pixel signals from the imaging pixels 2 on a single row selected by the vertical scanning circuit 3 are output in parallel to the vertical signal lines VL1, VL2, . . . VLn.

Charge integrating amps 9 are provided respectively for the respective columns, i.e., respectively for the vertical signal lines VL1, VL2, . . . VLn.

Each of the charge integrating amps 9 is formed by capacitors Ccp and Cs, switches Ssh, Srt, Spc, Spx, and Shd, and an amp A.

The capacitor Ccp (Ccp1 to Ccpn) is disposed in series between the input of the amp A (A1 to An) and the associated vertical signal line VL (VL1 to VLn).

The capacitor Cs (Cs1 to Csn) functions as a feedback capacitor for the amp A (A1 to An).

The amp A (A1 to An) functions as an inverting amp.

In this case, the amp A functions as a capacitance feedback amp, and it outputs a signal at a gain determined by the capacitance ratio of the capacitors Ccp and Cs. Charges of a pixel signal read from an imaging pixel 2 are accumulated in the capacitor Cs, so that the charge integrating amp 9 functions to hold the charges of the pixel signal.

Furthermore, an amp driving circuit 4 for driving the charge integrating amps 9 is provided. The amp driving circuit 4 supplies signals φSH, φRT, φPC, φXPC to the charge integrating amps 9 at specific timings.

In each of the charge integrating amps 9, the switch Ssh (Ssh1 to Sshn) turns on or off the input of the amp A from the associated vertical line VL according to the signal φSH.

The switch Srt (Srt1 to Srtn) functions to short-circuit the input and output of the amp A, and is turned on or off according to the signal φRT.

The switch Spc (Spc1 to Spcn) allows a charging system to be connected to the capacitor Cs, and is turned on or off according to the signal φPC.

The switch Spx (Spx1 to Spxn) is turned off when the capacitor Cs is to be charged, and is turned on or off according to the signal φXPC, which is an inverted pulse of the signal φPC.

The switch Shd (Shd1 to Shdn) is turned on when the output of the amp A is to be fixed to a hold voltage Vhd.

In FIG. 1, charge integrating amps 9 for n columns are shown, and the components of the charge integrating amps 9 are designated by signs (A, Ccp, Ssh, etc.) with "1" to "n" attached correspondingly to the respective columns. However, a number of columns (i.e., vertical signal lines VL) as necessary is formed on the (n+1)-th and subsequent columns that are not shown, and charge integrating amps 9 are also provided respectively for the columns.

The output terminals of the respective charge integrating amps 9 (the output terminals of the amps A1 to An . . . ) are connected to horizontal signal lines HL via the switches Ssl (Ssl1 to Ssln, Ssl(n+1) . . . ), respectively.

As shown in FIG. 1, the horizontal signal lines HL include n horizontal signal lines HL1 to HLn.

The amp A1 on the first column is connected to the horizontal signal line HL1 via the switch Ssl1. The amp A2 on the second column is connected to the horizontal signal line HL2 via the switch Ssl2. The amps A on the subsequent columns are similarly connected, and the amp An on the n-th column is connected to the horizontal signal line HLn via the switch Ssln.

Furthermore, the amp An+1 on the (n+1)-th column, not shown, is connected to the horizontal signal line HL1 via the switch Ssl(n+1), to which the amp A1 on the first column is also connected. The amps on the (n+2)-th and subsequent columns, not shown, are connected to the horizontal signal lines HL2, HL3, . . . in order.

That is, assuming that the pixel array 1 has M columns, the charge integrating amps 9 for the M columns are assigned in order and are connected to the n horizontal signal lines HL1 to HLn.

The horizontal scanning circuit 5 sequentially selects the charge integrating amps 9 so that pixel signals output from the charge integrating amps 9 are transferred by the horizontal signal lines HL respectively connected to the charge integrating amps 9. For this purpose, the horizontal scanning circuit 5 outputs amp selecting signals φS (φS1 to φSn . . . ) to the switches Ssl (Ssl1 to Ssln, Ssl(n+1) . . . ). A charge integrating amp 9 associated with a switch Ssl that is turned on by an amp selecting signal φS outputs a pixel signal to the associated horizontal signal line HL.

Furthermore, the horizontal scanning circuit 5 outputs amp controlling signals φP (φP1 to φPn . . . ) to the amps A1 to An . . . to control whether the respective amps A are to be in a standby state or an ON state. Accordingly, the amps A can be individually controlled to be in the ON state or the standby state. That is, when a pulse that serves as an amp controlling signal φP is at H level, an amp A that receives the pulse operates normally. On the other hand, when a pulse that serves as an amp controlling signal φP is at L level, an amp that receives the pulse enters the standby state, so that a current does not flow.

The horizontal scanning circuit 5 controls horizontal transfer by the amp selecting signals φS and the amp controlling signals φP. More specifically, for example, when a pixel signal from the charge integrating amp 9 on the first column is to be horizontally transferred, the horizontal scanning circuit 5 causes the amp A1 to return from the standby state to the ON state by the amp controlling signal φP1. Then, the horizontal scanning circuit 5 causes the switch Ssl1 to turn on by the amp selecting signal φS1.

The amp controlling signals φP are also supplied respectively to the associated switches Shd via inverters IV, and the switches Shd are turned on or off according to the amp controlling signals φP. Thus, when an amp A is in the standby state, the associated switch Shd is turned on, and when an amp A is turned on, the associated switch Shd is turned off.

Furthermore, in this embodiment, since a plurality of horizontal signal lines HL is provided, the outputs of the charge integrating amps 9 are transferred in parallel. Thus, a multiplexer 8 is provided on the output side to multiplex the outputs into a single line. That is, pixel signals of the respective columns, transferred by the horizontal signal lines HL1 to HLn, are sequentially selected by the multiplexer so that the pixel signals are output in the form of serial data from the output terminal 10 to a circuit at a subsequent stage, similarly to a case where only a single horizontal signal line HL is provided.

Furthermore, a black-level controlling circuit 6 for detecting the levels of output pixel signals and setting an appropriate black level is provided. The black-level controlling circuit 6 feeds back a signal to one end of each of the switches Spc of the charge integrating amps 9 via a clamp-voltage outputting amp 7.

The operation of the solid-state imaging device according to the first embodiment, constructed as described above, will be described with reference to a timing chart shown in FIG. 2.

Basically, pixel signals are read in a horizontal blanking period. In a horizontal blanking period, as shown in FIG. 2, an operation in a reset period and an operation in a reading period are carried out.

When starting a reset period, the horizontal scanning signal 5 pulls all the amp controlling signals φP (φP1, φP2, . . . ) to H level, so that the amps A on all the columns return from the standby state to the ON state.

On the pixel array 1, the imaging pixels 2 on one row are selected by the vertical scanning circuit 3. That is, the selecting transistors Ts on one row are turned on. Then, the reset transistors Trst on the row are turned on, so that reset levels Voff appear on the vertical signal lines VL via the amplifying transistors Tg on the row.

The reset levels Voff include reset noises of the imaging pixels 2 and variation among the threshold voltages of the amplifying transistors Tg, so that the reset levels Voff take on different values for the respective imaging pixels 2.

At this time, in each of the charge integrating amps 9, the switch Srt is turned on by the signal φRT, so that the input and output of the amp A is short-circuited to cause a feedback, whereby a threshold voltage Vat of the amp A appears on the output Vout.

At the same time, the switch Spc is turned on by the signal φPC, and the switch Spx is turned off by the signal φXPC, so that one end of the capacitor Cs is fixed to a clamp voltage Vcp by the clamp-voltage outputting amp 7.

At this time, the capacitor Cs holds the potential of the clamp voltage Vcp with reference to the threshold voltage Vat.

Also, the capacitor Ccp holds the reset voltage Voff of the relevant imaging pixel 2 with reference to the threshold voltage Vat.

Then, the signals φRT and φPC are caused to fall, so that the switches Srt and Spc are turned off in order, and then the signal φXPC is caused to rise so that the switch Spx is turned on.

When the switch Spx is turned on, a feedback is provided to the amp A via the capacitor Cs, so that the input of the amp A is maintained at the same threshold voltage Vat as before. Thus, at the output Vout of the amp A, the clamp potential Vcp appears due to charges held by the capacitor Cs.

Then, a reading period is started.

First, the transferring transistors Ttr of the imaging pixels 2 on the row selected by the vertical scanning circuit 3 are turned on, so that charges are transferred from the photodiodes PD, whereby signal levels Vsig are output from the imaging pixels 2 to the vertical signal lines VL.

Since the signals appear as superposed on the reset levels Voff described earlier, the signals can be expressed as Voff−Vsig.

Since each of the charge integrating amps 9 stores the value of the reset level Voff in the capacitor Ccp, the charge integrating amp 9 integrates only the amount of shift from the reset level Voff and outputs the result. At this time, the gain of reading is determined by the capacitance ratio, as expressed below:

$$Vout=(Ccp/Cs)Vsig+Vcp \quad (1)$$

where Vout denotes the output voltage of the charge integrating amp 9. As will be understood from equation (1), the output Vout does not depend on the reset level Voff of the imaging pixel 2 or the threshold voltage Vat of the amp A.

In the reading operation described above, the order of reading is such that the reset level Voff is read from the imaging pixel 2 and then the signal level Vsig is read. Alternatively, the order may be such that the signal level Vsig is read first and then the reset level Voff is read.

Then, the operation proceeds from the horizontal blanking period to an effective period. At this time, the amp controlling signals φP (φP1, φP2, . . . ) are all pulled to L level. Thus, the amps A of the respective columns enter the standby state, so that currents do not flow.

At this time, the output of each of the amps A is indeterminate without taking any measure. When the output is indeterminate, a signal stored in the capacitor Cs is not necessarily maintained.

More specifically, assuming that the switch Ssh is implemented by an NMOS transistor, the switch SSh is caused to enter an OFF state by pulling the gate voltage thereof to GND level. However, when the output of the amp A is indeterminate, the output Vout of the amp A could drop to GND level due to the effect of a leak current or the like. Then, the input of the amp drops to a negative potential via the capacitor Cs. Thus, the source voltage of the NMOS transistor becomes lower than the gate voltage thereof, so that the switch Ssh is turned on, whereby signal charges leak from the capacitor Cs. Obviously, when signal charges leaks from the capacitor Cs as described above, even when the amp A is returned to the ON state, it is not possible to supply a correct pixel signal to the horizontal signal line HL.

Thus, in this embodiment, in order to prevent such a situation, the amp controlling signal φP is inverted by the inverter IV and the switch Shd is controlled by the inverted pulse. That is, when the amp A is in the standby state, the switch Shd is turned on by the inverted pulse so that the output Vout of the amp A is fixed to the predetermined holding voltage Vhd.

Thus, even when the amp A is in the standby state, the output Vout of the amp A is prevented from becoming indeterminate, so that loss of data stored in the capacitor Cs is prevented.

At this time, a voltage Vin at the input of the amp A is determined by the amount of charges accumulated in the capacitor Cs, and can be expressed as:

$$Vin=Vhd-((Ccp/Cs)Vsig+Vcp)-Vat) \quad (2)$$

The value of the holding voltage Vhd is preferably chosen in consideration of the capacitances of the capacitors Ccp and Cs and the maximum amount of the signal charges Vsig so that the potential of the input voltage Vin does not become negative. Particularly, when an off leak of the NMOS transistor of a process used is large, consideration must be paid to reduce leak by preventing the value of the input voltage Vin from becoming too low so that a backward bias is constantly applied to the NMOS transistor.

The above description has been made in the context of an example where the switch Ssh is implemented by an NMOS transistor. When the switch Ssh is implemented by a PMOS transistor, consideration must be paid so that the source voltage thereof does not become higher than the gate voltage thereof.

As described above, by the operation of the switch Shd and the fixed holding potential Vhd, even when the amp A is in the standby state, a signal read in a horizontal blanking period can be maintained in the capacitor Cs.

After that, it suffices to cause the amp A to return from the standby state when the signal is to be transferred horizontally.

Thus, the time in which a current actually flows is very short, so that power consumption is reduced compared with the related art.

Horizontal transfer is driven by the amps A provided for the respective columns.

When signals of the imaging pixels 2 are read out in the vertical direction, it is possible to read the signals slowly using a horizontal blanking period. In the case of the horizontal direction, signals must be transferred at a predetermined data rate, so that a high-speed operation is needed. Since a horizontal signal line HL is long and stray capacitance is large due to a large number of switches being connected, a certain degree of driving ability is required to drive the horizontal signal lines HL quickly. It is difficult to drive the horizontal signal lines HL by the amps A that are laid out for the respective columns, causing increase in the layout area.

Thus, in this embodiment, a plurality of horizontal signal lines HL1 to HLn is provided as described above, and signals are transferred in parallel to reduce the data rate. The number (n) of horizontal signal lines HL is not limited. The data rate per one line is decreased as the number of horizontal signal lines HL is increased. Usually, the number of horizontal signal lines HL is preferably such that the driving speed is substantially the same as that in the reading operation in the horizontal blanking period.

Figure 2:
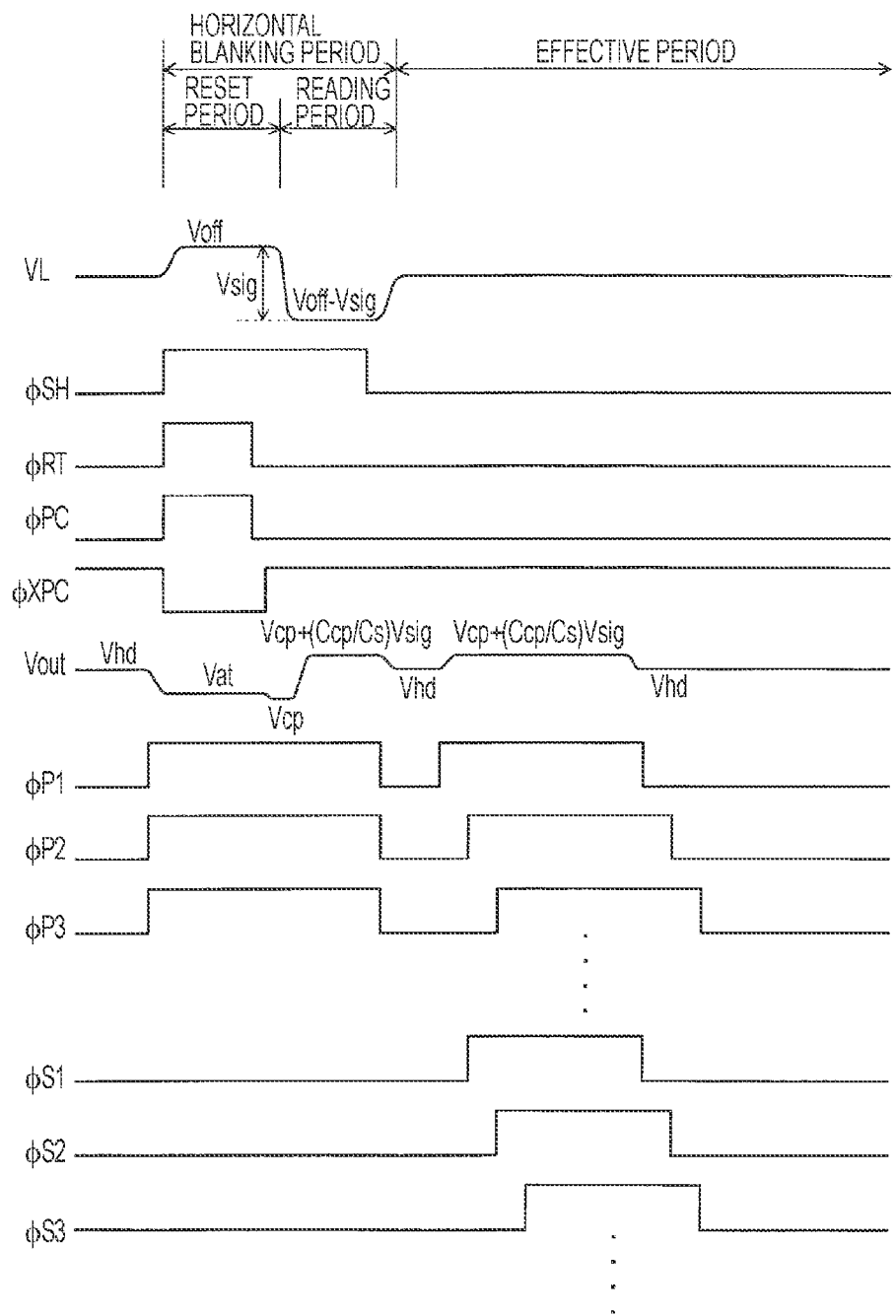
FIG. 2 is a diagram showing timing of an operation for reading pixel signals according to the first embodiment.

In the effective period shown in FIG. 2, as described earlier, after the amp controlling signals φP are all pulled to L level, the horizontal scanning circuit 5 sequentially pulls the amp controlling signals φP to H level for a predetermined period, one by one in order starting from the first column, thereby sequentially activating the amps A of the respective columns. At the same time, the horizontal scanning circuit 5 sequentially turns on the switches Ssl by the amp selecting signals φS so that signals are transferred by the horizontal signal lines HL.

More specifically, in the effective period, in order to horizontally transfer a pixel signal of the first column, the amp controlling signal φP1 is pulled to H level so that the amp A1 is activated from the standby state. Immediately after that, the amp selecting signal φS1 is pulled to H level so that the output of the amp A1 is transferred by the horizontal signal line HL1.

Then, with a shift of transfer timing for one pixel, in order to horizontally transfer a pixel signal of the second column, the amp controlling signal φP2 is pulled to H level so that the amp A2 is activated from the standby state. Immediately after that, the amp selecting signal φS2 is pulled to H level so that the output of the amp A2 is transferred by the horizontal signal line HL2.

In this manner, horizontal transfer is carried out sequentially for the columns.

Thus, the amps A1, A2, . . . operate sequentially one by one with timing shifts of one pixel period. Furthermore, the switches Ssl1, Ssl2, . . . are periodically connected to the horizontal signal lines HL in order.

The amp selecting signals φS are pulses having a width that is determined based on the number of horizontal signal lines HL. Since the amp selecting signals φS are shifted in order by one pixel period, the amp selecting signals φS have overlapping periods as shown in FIG. 2. In the example shown in FIG. 2, it is assumed that the number of horizontal signal lines HL is five.

Pixel signals held by the amps A are respectively transferred by the associated horizontal signal lines while the relevant amp selecting signals φS are at H level. Thus, for example, as shown in parts (a), (b), and (c) of FIG. 7, the outputs of the respective amps A are transferred by the associated horizontal signal lines HL overlappingly with a timing shift of one clock period.

Since signals are horizontally transferred while the relevant amp selecting signals φS are at H level, it suffices for the amp controlling signals φP to be pulled to H level only in those periods to activate the amps. In this embodiment, however, considering that it takes some time to activate the amps A, the amp controlling signals φP are activated earlier than the amp selecting signals φS. That is, the amps A1, A2, . . . are controlled to be turned on by the amp controlling signals φP, and are then connected to the horizontal signal lines by the amp selecting signals φS.

Figure 3:
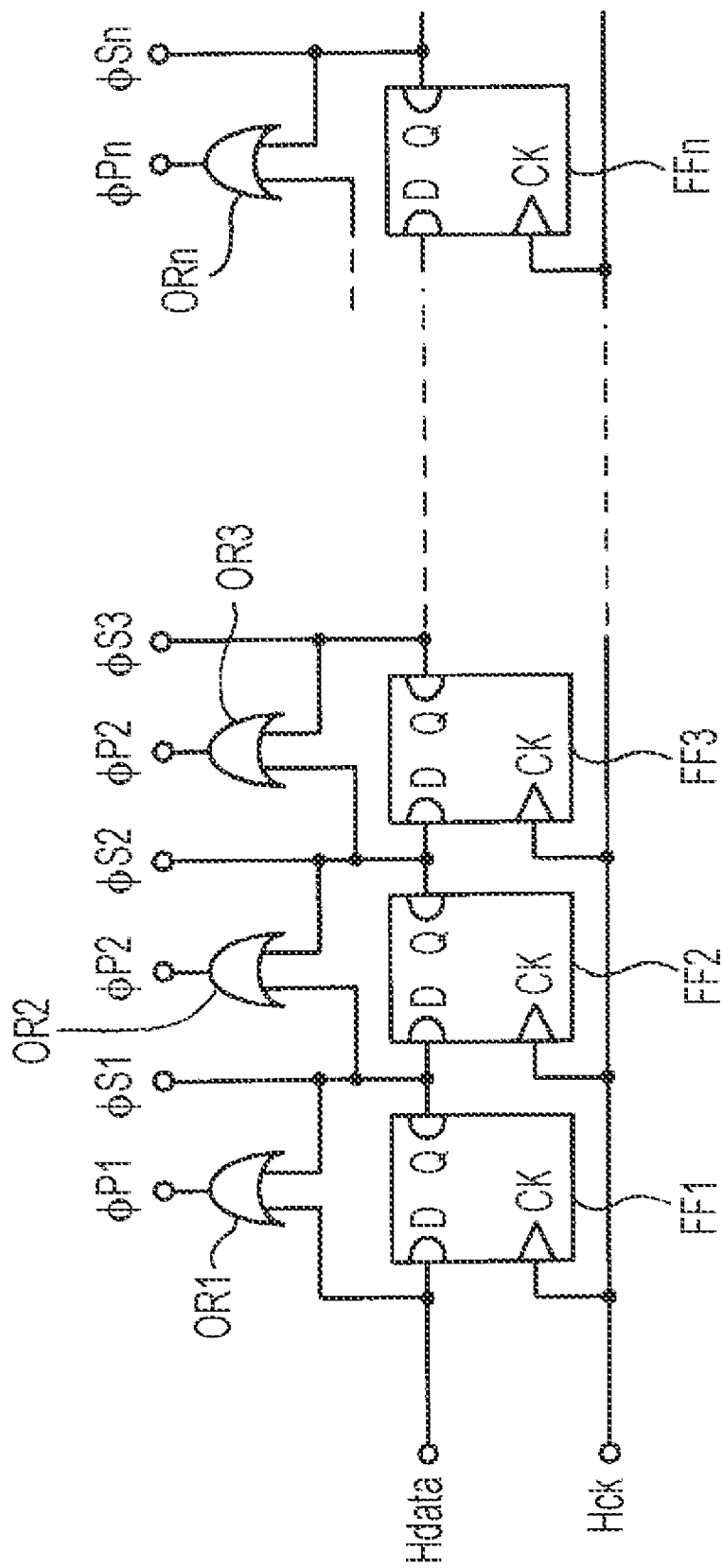
FIG. 3 is a diagram showing an example circuit of a horizontal scanning circuit according to the first embodiment.

The horizontal scanning circuit 5 for generating the amp controlling signals φP and the amp selecting signals φS can be implemented by a simple circuit, for example, as shown in FIG. 3.

Figure 4:
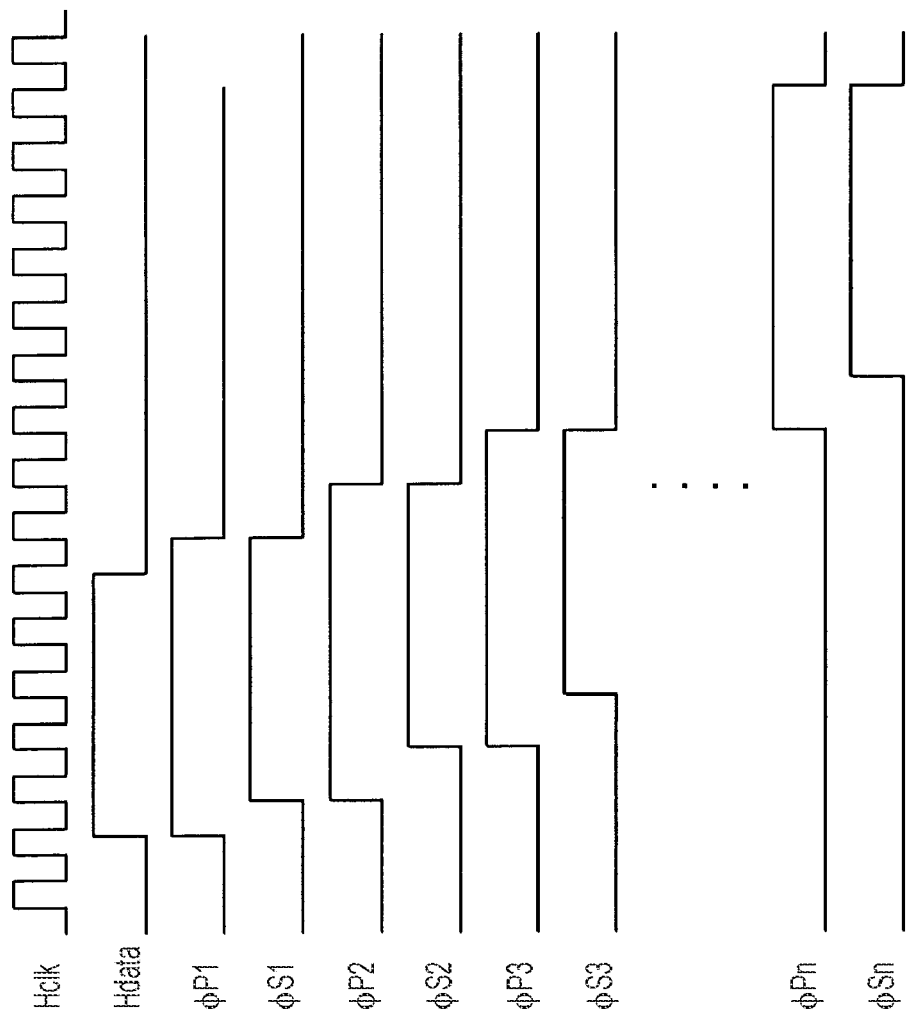
FIG. 4 is a diagram showing operation timing of the horizontal scanning circuit according to the first embodiment.

The horizontal scanning circuit 5 shown in FIG. 3 includes a shift register implemented by flip-flops FF (FF1, FF2 to FFn . . . ), and OR gates OR1, OR2 to ORn . . . FIG. 4 shows operation timing of the horizontal scanning circuit 5.

Each of the flip-flops FF has a clock input terminal to which a clock Hclk shown in FIG. 4 is supplied, and it latches a D input at the timing of the clock Hclk. The clock Hclk has a clock rate that is the same as the data rate of pixel signals.

As the D input to the first flip-flop FF1, a data pulse Hdata shown in FIG. 4 is supplied. The data pulse Hdata has a wide pulse relative to the clock rate, as shown in FIG. 4.

The Q outputs (latch outputs) of the respective flip-flops FF1, FF2, FF3, . . . serve as the amp selecting signals φS1, φS2, φS3, . . . respectively.

The amp controlling signal φP (φP1, φP2, φP3 . . . ) are obtained as outputs of the OR gates OR (OR1, OR2, OR3, . . . ).

The OR gate OR1 takes the logical OR of the data pulse Hdata supplied thereto and the Q output of the flip-flop FF1 to generate the amp controlling signal φP1. The OR gate OR2 takes the logical OR of the Q output of the flip-flop FF2 and the Q output of the flip-flop FF1 to generate the amp controlling signal φP2. The OR gate OR3 takes the logical OR of the Q output of the flip-flop FF3 and the Q output of the flip-flop FF2 to generate the amp controlling signal φP3.

That is, the amp controlling signal φPn for the n-th amp An is generated by taking the logical OR of the amp selecting signal φSn for the n-th amp An and the amp selecting signal φSn−1 for the (n−1)-th amp An−1.

In this embodiment, in order to carry out horizontal transfer using a plurality of horizontal signal lines HL, the amp selecting signals φS must have a pulse width corresponding to the data rate of pixel signals multiplied by the number of horizontal signal lines. By inputting data pulse Hdata having a pulse width corresponding to the data rate of pixel signals multiplied by the number of signal lines to the simple horizontal scanning circuit 5 implemented using a shift register circuit, pulses that have a needed pulse width and that are shifted in accordance with the data rate of pixel signals, i.e., the amp selecting signals φS1, φS2, . . . can be readily generated.

As for the amp controlling signals φP that are used to cause the amps A to return from the standby state, as described earlier, it is needed that the amp controlling signals φP rise earlier than the amp selecting signals φS. The circuit including OR gates, shown in FIG. 3, is used so that an amp controlling signal φPn is generated by taking the logical OR of the pulse of an amp selecting signal φSn and the pulse of a previous amp selecting signal φSn−1. Thus, the amp controlling signal φPn that rises earlier than the amp selecting signal ϕSn and that falls simultaneously with the amp selecting signal ϕSn can be readily generated.

That is, the horizontal scanning circuit 5 generates each of the amp controlling signals ϕP1, ϕP2, . . . for the respective amps A1, A2, . . . by taking the logical OR of the pulse of the amp selecting signal ϕS(x) for the associated amp A(x) and a pulse whose edge timing is advanced (i.e., the amp selecting signal ϕS(y) for the amp A(y) that is selected earlier).

In the example shown in FIGS. 3 and 4, the amp controlling signal ϕPn rises earlier than the amp selecting signal ϕSn by one clock. If the amp controlling signal ϕPn is to rise earlier by two clocks, the amp controlling signal ϕPn is generated by taking the logical OR of the amp selecting signal ϕSn and the amp selecting signal ϕSn−2. It is possible to cause the amp controlling signal ϕPn to rise earlier by a plurality of clocks in a similar manner. Note, however, that since it is not possible to cause the first amp controlling signal ϕP1 to rise earlier than the amp selecting signal ϕS1 by two clocks in the arrangement shown in FIG. 3, an extra flip-flop is provided at a previous stage of the flip-flop FF1 in the shift register to carry out dummy shifting.

By the horizontal scanning circuit 5 of the example described above, the switch Shd is turned off when the amp controlling signal ϕP rises, and the output of the amp A returns to the value expressed by equation (1).

When the horizontal transfer completes and the amp selecting signal ϕS falls, the amp controlling signal ϕP also falls and the amp A returns to the standby state.

By the amp driving method described above, of the amps A provided respectively for the columns, the same number of amps A as the number of horizontal signal lines HL are activated. The other amps A are in the standby state, and currents do not flow. Therefore, power consumption is low. Furthermore, since the data rate per one horizontal signal line HL is decreased, the amps A do not require a high driving ability, so that it is possible to lay out the amps A for the respective columns.

Figure 5:
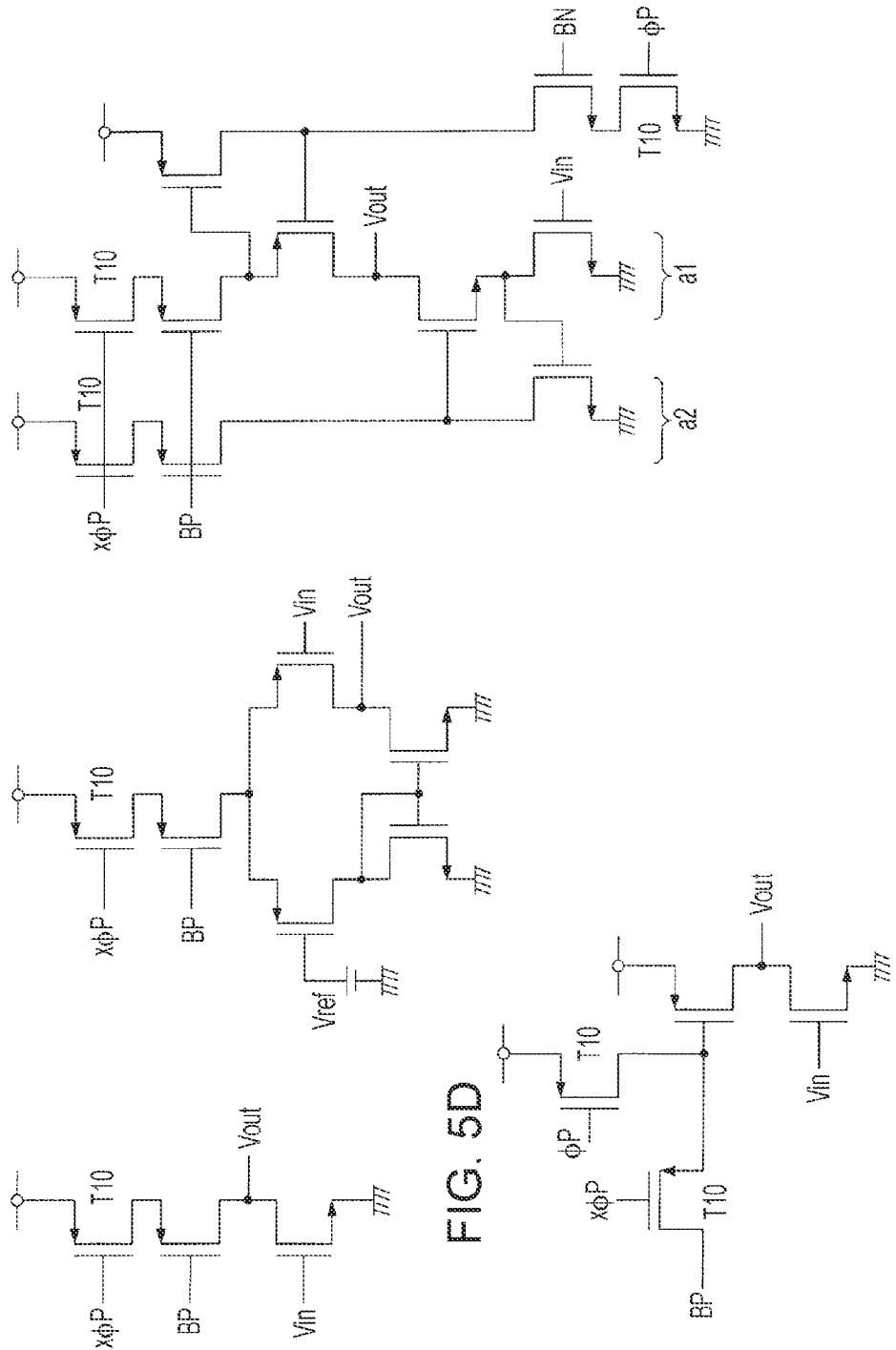
FIGS. 5A to 5D are diagrams showing example circuits of a charge integrating amp according to the first embodiment.

FIGS. 5A to 5D show specific example circuits of the amps A provided for the respective columns. In all the examples, an inverted amp is formed. FIG. 5A shows a typical source-grounded amp, in which a transistor T10 is additionally provided for standby. The signal xϕP denotes an inverted pulse of the signal ϕP.

FIG. 5B shows a differential amp, which has an advantage that the threshold voltage Vat can be controlled by Vref when a feedback is provided. Also in this example, a transistor T10 is additionally provided for standby.

FIG. 5C shows a regulated cascode circuit in which an auxiliary amp a2 is provided to increase the gain of a source-grounded amp a1. A regulated cascode is described in detail in IEEE Journal of Solid-State Circuit, Vol. 25, No. 1, February 1990. Also in this example, a transistor T10 is additionally provided for standby.

FIG. 5D shows a modification in which the transistor T10 for standby is provided in a different manner, in which transistors are not disposed in series, so that insusceptibility to variation is improved. Although the circuit shown in FIG. 5D is a modification of the circuit shown in FIG. 5A, the similar connection of a standby transistor can be applied to the circuit shown in FIG. 5B.

As described above, horizontal transfer is carried out in parallel by a plurality of horizontal signal lines HL, and the plurality of horizontal signal lines HL is sequentially selected by the multiplexer 8 for output.

Figure 6:
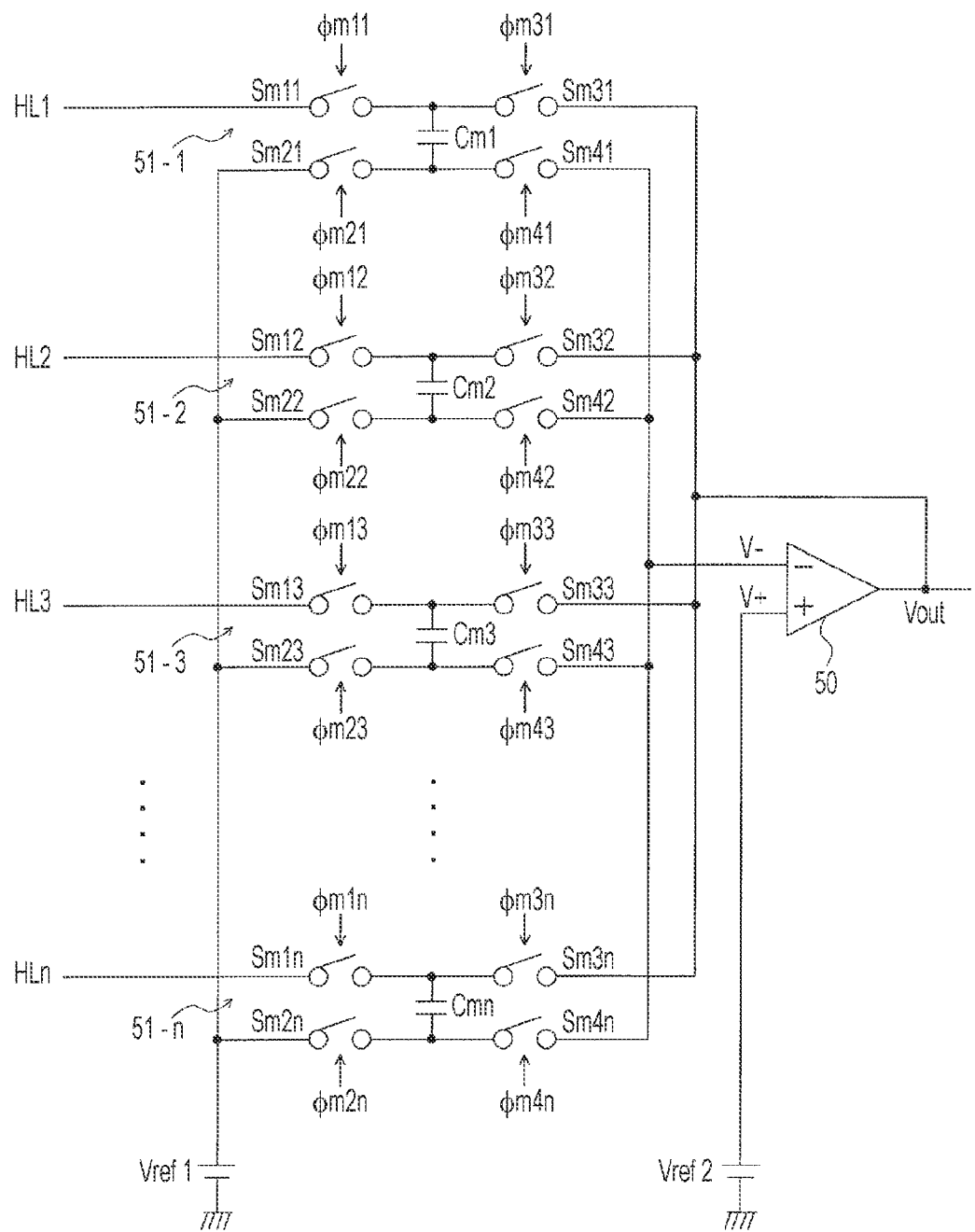
FIG. 6 is a diagram showing the construction of a multiplexer according to the first embodiment.

FIG. 6 shows an example circuit of the multiplexer 8.

The multiplexer 8 includes sampling circuits 51-1 to 51-n respectively associated with the horizontal signal lines HL1 to HLn, and an output amp 50.

Each of the sampling circuits 51-1 to 51-n is formed by four switches Sm and a capacitor Cm.

For example, the sampling circuit 51-1 includes switches Sm11, Sm21, Sm31, and Sm41, and a capacitor Cm1. The switches Sm11, Sm21, Sm31, and Sm41 are turned on or off by the signals ϕm11, ϕm21, ϕm31, and ϕm41. The signals ϕm11, ϕm21, ϕm31, and ϕm41 are generated, for example, by a timing generator (not shown) in the multiplexer 8 so that the signals are pulled to H level at specific timings with reference to a horizontal sync signal.

The switch Sm11 allows the horizontal signal line HL1 to be connected to the capacitor Cm1. The switch Sm21 allows a reference for the capacitor Cm1 to be connected to a reference voltage Vref1. The switches Sm31 and Sm41 allow charges of the capacitor Cm1 to be transferred to the output amp 50. That is, when the switches Sm31 and Sm41 are turned on, the capacitor Cm1 is connected in the feedback path of the output amp 50. The other sampling circuits 51-2 to 51-n are configured similarly to the sampling circuit 51-1.

The non-inverting input V+ of the output amp 50 is connected to a reference voltage Vref2.

Figure 7:
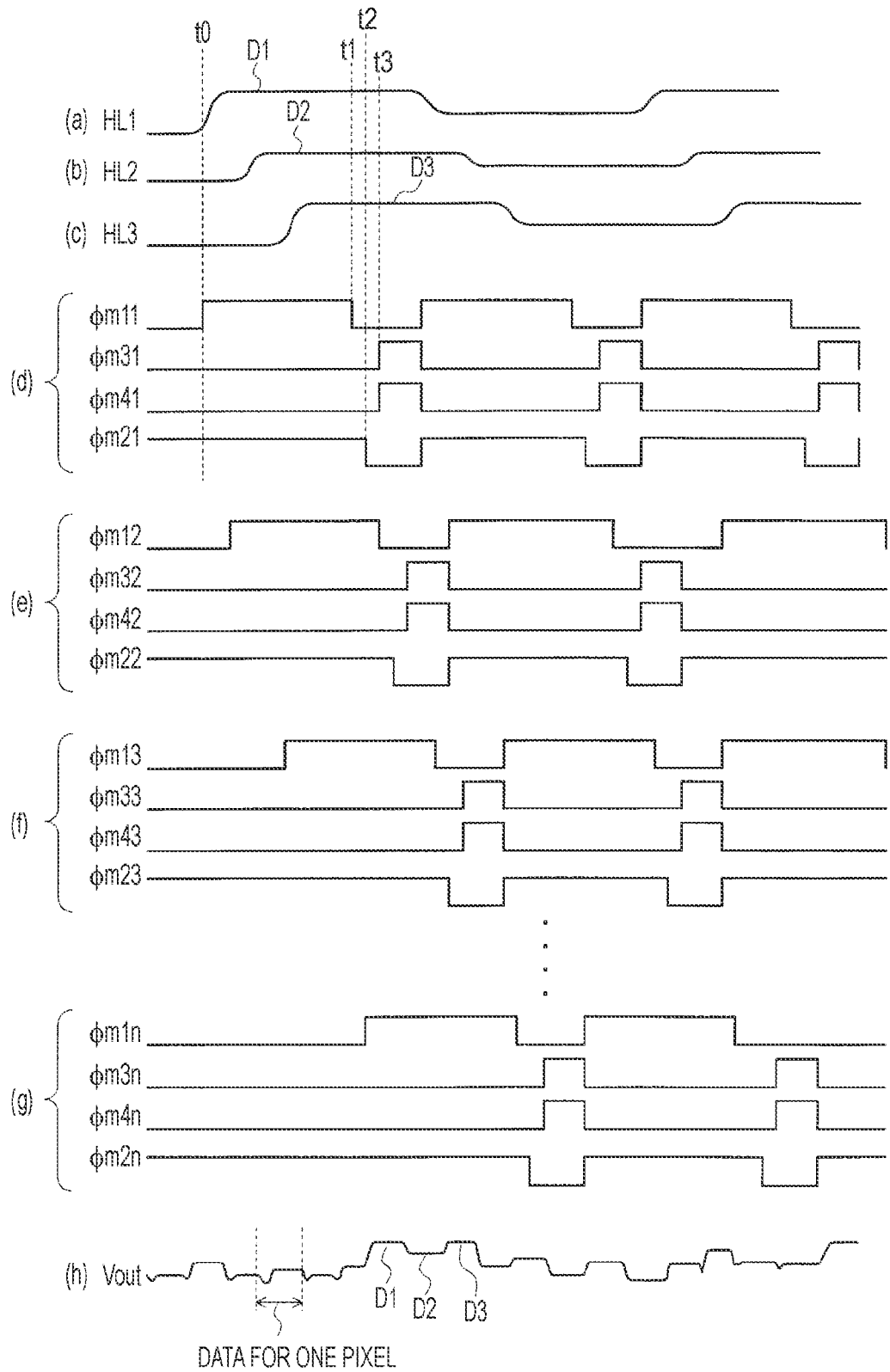
FIG. 7 is a diagram showing operation timing of the multiplexer according to the first embodiment.

FIG. 7 shows a timing chart of the operation of the multiplexer 8.

As described with reference to FIG. 2, the amps A of the respective columns for driving the horizontal signal lines HL sequentially operate with timing shifts of one pixel period, so that the outputs thereof are also sequentially shifted by one pixel period.

Pixel signals held by the amps A by the horizontal transfer operation described above are transferred overlappingly with shifts of one clock period (one pixel period) on the plurality of horizontal signal lines HL, as indicated by signals D1, D2, and D3 in parts (a), (b), and (c) of FIG. 7.

Description will be given with regard to the horizontal signal line HL1 and the sampling circuit 51-1 with reference to parts (a) and (d) of FIG. 7.

At time t0, signals ϕm11 and ϕm21 are pulled to H level, so that the switches Sm11 and Sm21 are both turned on. The output of the horizontal signal line HL1 charges the capacitor Cm1 with reference to the reference voltage Vref1.

At time t1, the signal ϕm11 is pulled to L level, and at time t2, the signal ϕm21 is pulled to L level. Thus, the switches Sm11 and Sm21 are sequentially turned off, so that the voltage on the horizontal signal line HL1 is sampled by the capacitor Cm1.

Finally, at time t3, signals ϕm31 and ϕm41 are simultaneously pulled to H level, so that the switches Sm31 and Sm41 are simultaneously turned on, whereby the capacitor Cm1 is connected to the output amp 50.

Since the capacitor Cm1 is connected between the output terminal Vout of the output amp 50 and the negative input terminal V− thereof, virtual grounding occurs, and the output amp 50 outputs, as the output Vout, a potential difference accumulated in the capacitor Cm1 with reference to the reference voltage Vref2. Letting the output of the horizontal signal line HL1 be denoted as Vhl1 and the output voltage of the amp as Vout, the output voltage Vout can be expressed as:

$$Vout = Vref2 + (Vhl1 - Vref1) \qquad (3)$$

Assuming that the reference voltage Vref1 is equal to the reference voltage Vref2, equation (3) can be rewritten as:

$$Vout = Vhl1 \qquad (4)$$

Thus, the output of the horizontal signal line HL1, i.e., the output of the amp A as expressed by equation (1) is directly output. Preferably, the reference voltages Vref1 and Vref2 are chosen to be equal when no particular reason exists for choosing the values otherwise.

Although the above description has been made with regard to the horizontal signal line HL1 and the sampling circuit 51-1, as will be understood with reference to parts (b), (c), (e), (f), and (g) of FIG. 7, the sampling circuits 51-2 to 51-n repeat similar operations for the horizontal signal lines HL2 to HLn with timing shifts of one pixel period, so that data is continuously transferred to the output amp.

Thus, for example, as shown in parts (a), (b), and (c) of FIG. 7, the signals D1, D2, and D3 that appear on the horizontal signal lines HL1, HL2, and HL3 are output in the form of serial data at the output Vout shown in part (h) of FIG. 7.

By implementing the multiplexer 8 by the circuit described above, data transferred in parallel through the plurality of horizontal signal lines HL1 to HLn is efficiently converted into a single line of serial data. Although only the single output amp 50 is provided in the embodiment described above, a plurality of output amps may be provided to form a plurality of output channels. This is possible simply by changing the connections and operation timings of the switches Sm3* and Sm4*.

As described above, according to the first embodiment, it is possible to read pixel signals efficiently using the charge integrating amps 9. Furthermore, since a precharging voltage of the capacitor Cs is generated by the black-level controlling circuit 6 and the clamp-voltage outputting amp 7, the black level can be controlled without being affected by variation among the threshold voltages of the amps A.

Furthermore, in an effective period, the charge integrating amps 9 are allowed to enter the standby state while holding the signals read in a horizontal blanking period. Thus, the charge integrating amps 9 are activated only at timing of horizontal transfer and enter the standby state in other periods, so that power consumption is considerably reduced.

Furthermore, by carrying out horizontal transfer using the plurality of horizontal signal lines HL1 to HLn in parallel, data rate per one horizontal signal line HL is reduced. Thus, it is possible to drive horizontal signal lines HL by the amps A having low driving ability, laid out for the respective columns. Therefore, increase in layout area caused by providing amps having high driving ability is avoided. Furthermore, since the multiplexer 8 is provided, data transferred in parallel by the plurality of horizontal signal lines HL1 to HLn is efficiently converted into serial data.

Second Embodiment

Figure 8:
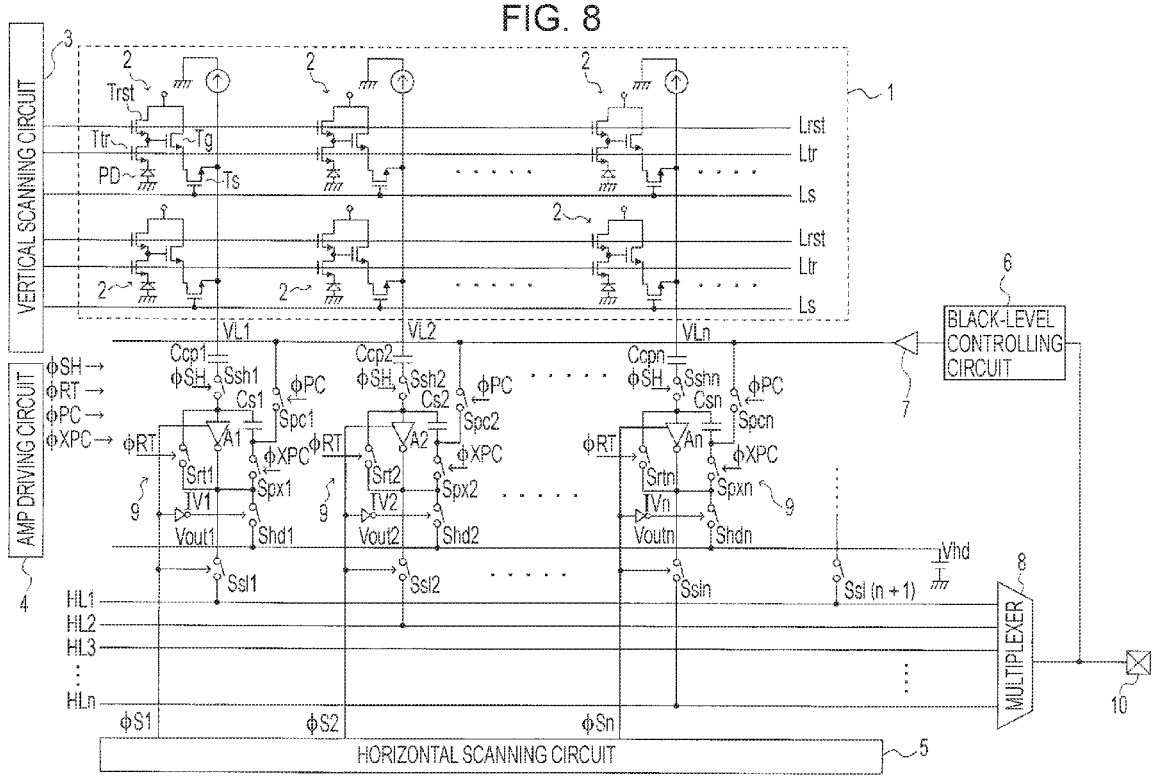
FIG. 8 is a diagram showing a construction according to a second embodiment of the present invention.

FIG. 8 shows a construction according to a second embodiment of the present invention. In the following description of embodiments, parts corresponding to those in FIG. 1 are designated by the same numerals, and descriptions thereof will be omitted.

The construction shown in FIG. 8 is basically the same as that of the first embodiment shown in FIG. 1, but differs in that signals φS (φS1, φS2, . . . ) output from the horizontal scanning circuit 5 are commonly used as amp controlling signals and amp selecting signals.

That is, the horizontal scanning circuit 5 supplies the signals φS to control standby of the amps A and to control the switches Shd.

In the first embodiment described above, the amp controlling signals φP are caused to rise somewhat earlier than the amp selecting signals φS in consideration of the time for the amps A to return from the standby state, as described with reference to FIG. 2. If the amps A do not take much time to return from the standby state, it is possible to use the signals φS as the signals φP, as shown in FIG. 8.

Thus, the horizontal scanning circuit 5 is simplified, and the layout is facilitated since the number of vertical lines (lines in the column direction) is reduced.

Figure 9:
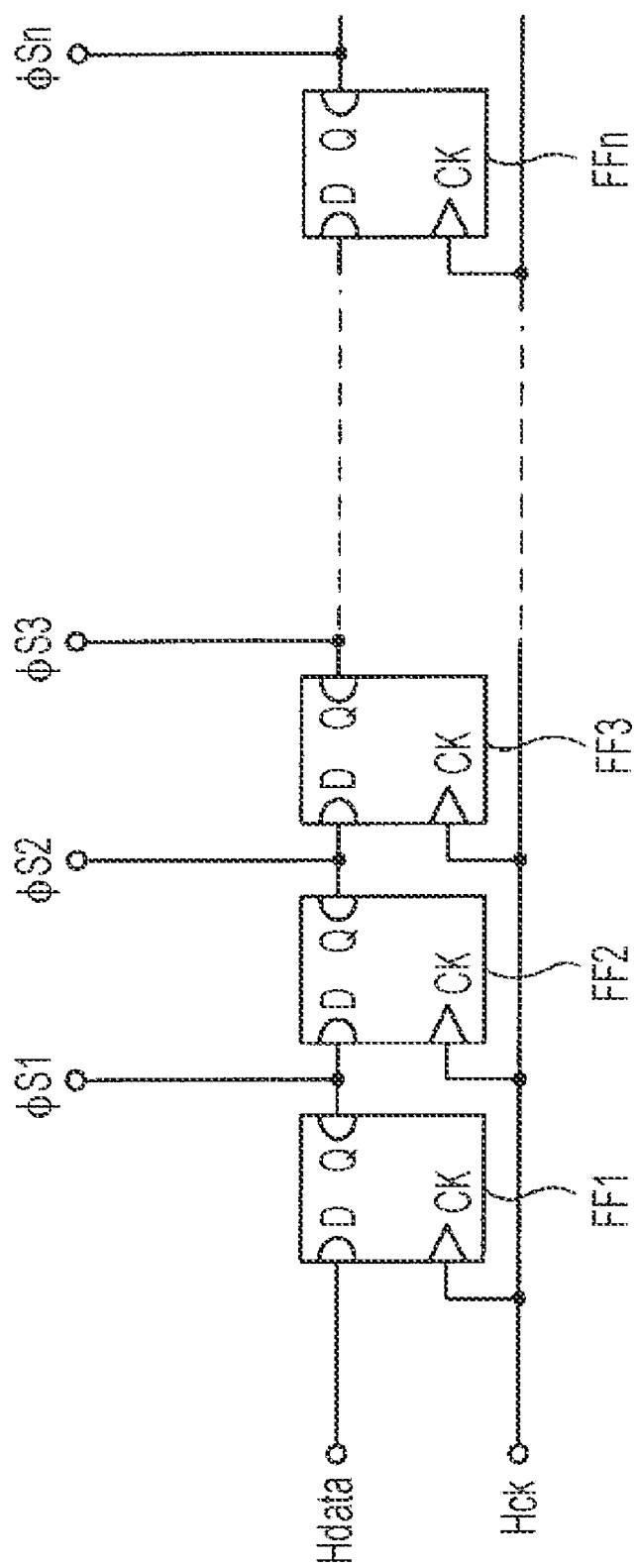
FIG. 9 is a diagram showing an example circuit of a horizontal scanning circuit according to the second embodiment.

In the case where common signals are used for the amp controlling signals φP for causing the amps A to return from the standby state and the amp selecting signals φS for connecting the amps A to the horizontal signal lines HL, the horizontal scanning circuit 5 can be implemented by a circuit shown in FIG. 9.

Figure 10:
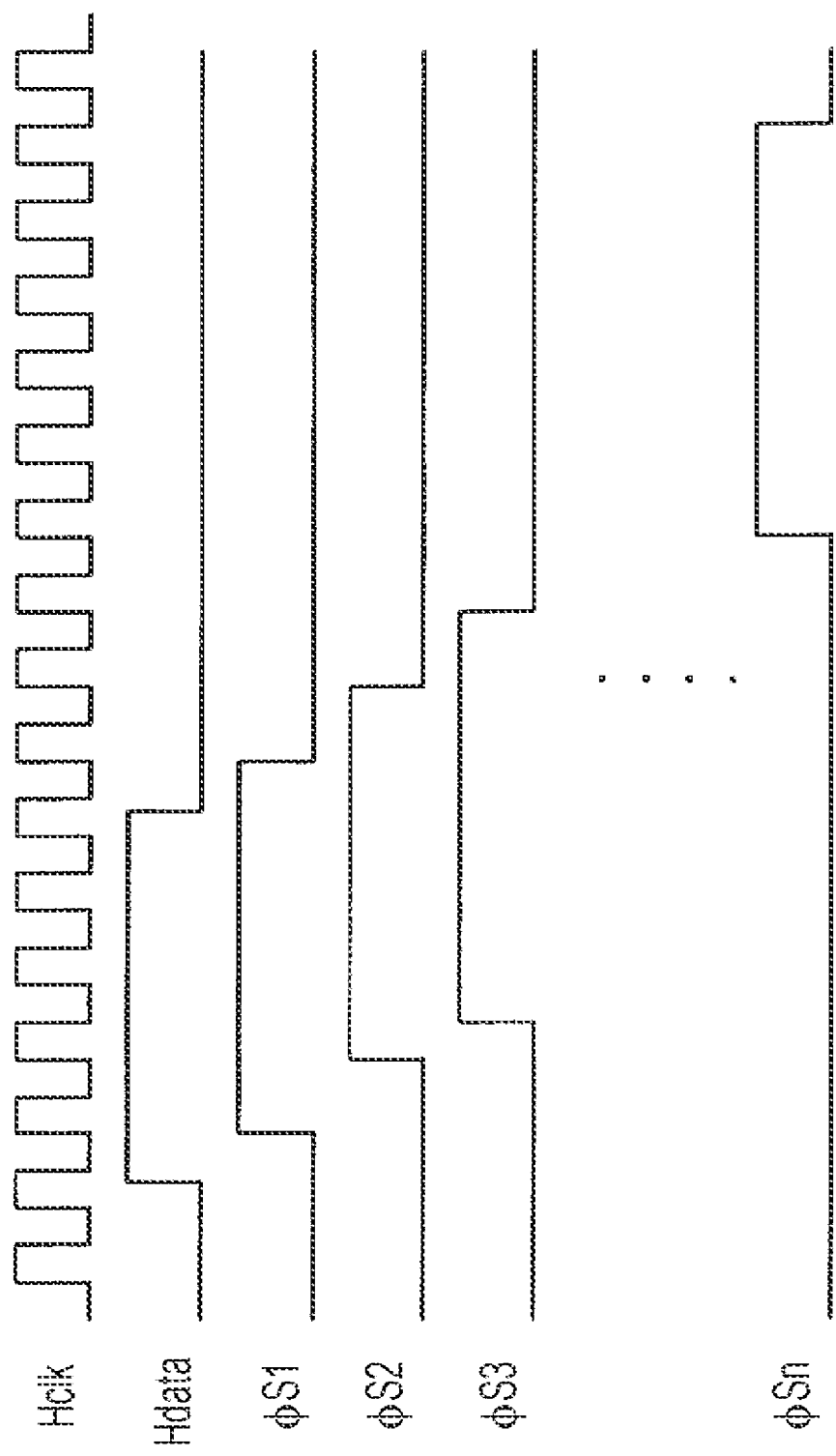
FIG. 10 is a diagram showing operation timing of the horizontal scanning circuit according to the second embodiment.

The arrangement shown in FIG. 9 differs from the arrangement shown in FIG. 3 in that the OR gates for generating the amp controlling signals φP are omitted, so that the arrangement shown in FIG. 9 is simpler than that shown in FIG. 3. FIG. 10 shows operation timing of the arrangement shown in FIG. 9, which is the same as the operation timing shown in FIG. 4 except in that the amp controlling signals φP are omitted (i.e., the amp selecting signals φS also function as the amp controlling signals φP).

Third Embodiment

Figure 11:
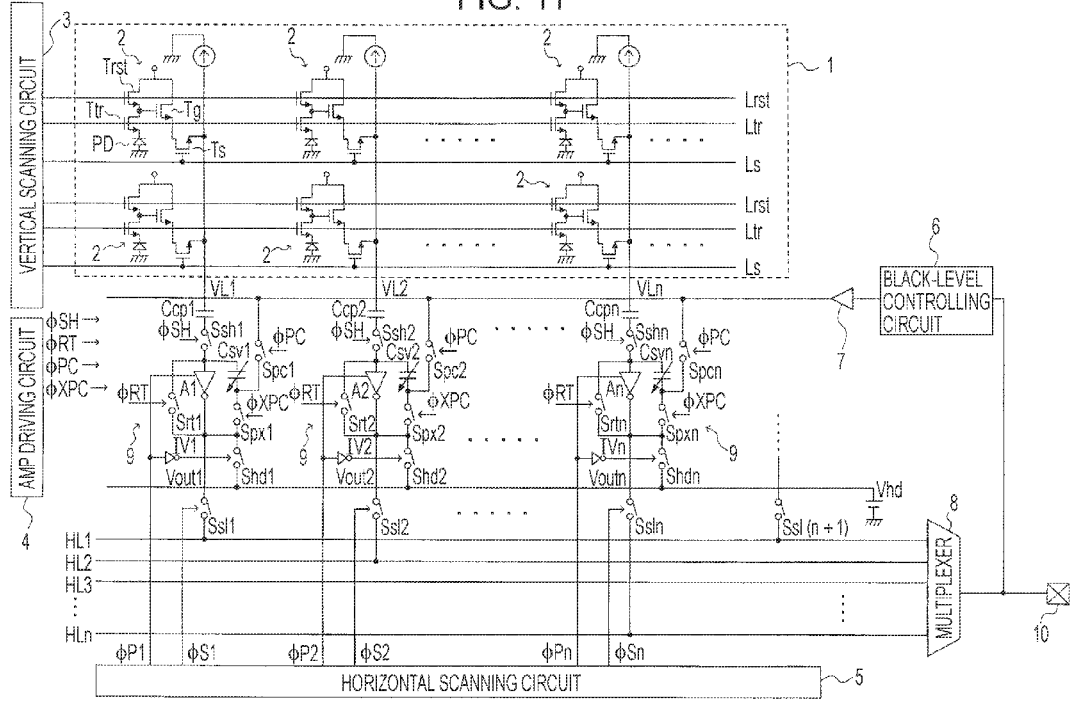
FIG. 11 is a diagram showing a construction according to a third embodiment of the present invention.

FIG. 11 shows a third embodiment of the present invention. In this embodiment, feedback capacitors Csv (Csv1, Csv2, . . . ) of the amps A in the charge integrating amps 9 are implemented by variable capacitors.

Thus, the term Ccp/Cs in equation (1) becomes variable, so that variable-gain amplifiers are implemented.

It is to be readily understood that the variable capacitors Cvs can be implemented by allowing selection from a plurality of capacitors by switches. In that case, pulses for selecting capacitance are output from the amp driving circuit 4.

According to the third embodiment, the function of programmable gain amp (PGA), which is required in a camera system, can be implemented in the charge integrating amps 9. Thus, systems at subsequent stages can be simplified, and the gain is increased at an early stage. Accordingly, sufficient signal amplitude is ensured even when pixel signal levels are small, and insusceptibility to noise is improved.

Fourth Embodiment

Figure 12:
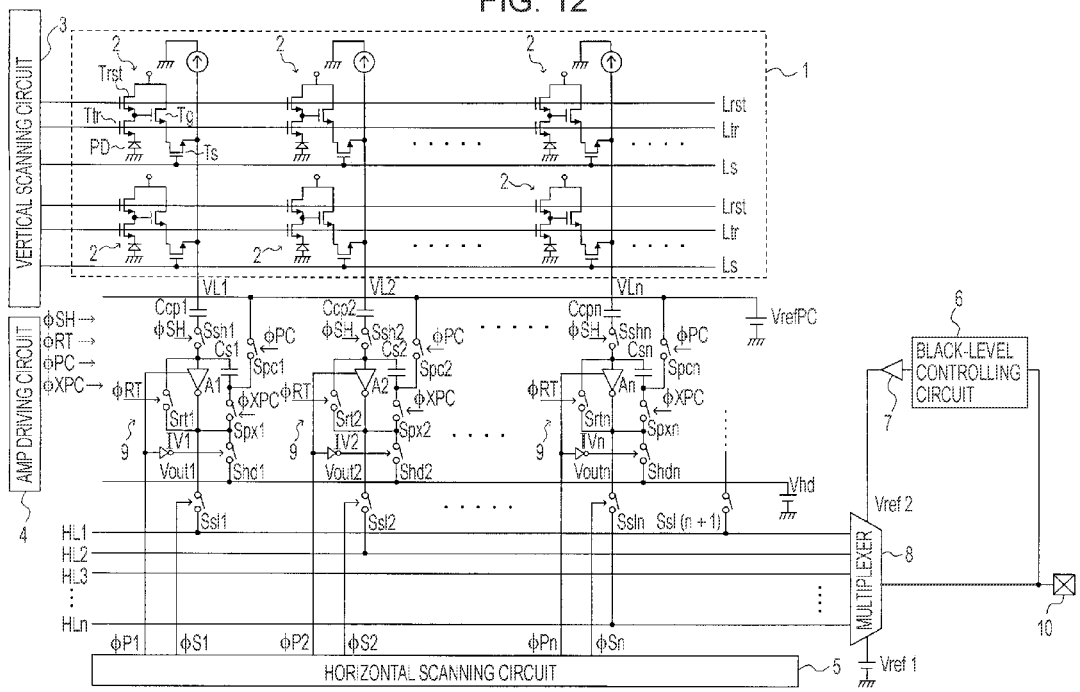
FIG. 12 is a diagram showing a construction according to a fourth embodiment of the present invention.

FIG. 12 shows a fourth embodiment of the present invention.

In the fourth embodiment, a fixed voltage VrefPC is used as a precharging voltage for feedback capacitors Cs in the charge integrating amps 9.

The black-level controlling circuit 6 and the clamp-voltage outputting amp 7 generate a clamp voltage, which is fed back to the reference voltage Vref2 (refer to FIG. 6) of the multiplexer 8.

Then, the reference voltage Vref2 in equation (3), i.e., the reference for the output amp 50 in the multiplexer 8, functions as a clamp voltage in accordance with the black level, so that the black level is controlled appropriately.

In the case of the first embodiment, since the reference for pixel signals that are read is controlled based on the black level, the black level can be controlled only in a horizontal blanking period, i.e., only once in a horizontal period. In contrast, when clamping is exercised by the multiplexer 8 as shown in FIG. 12, time for a clamping operation is not limited, so that the black level can be controlled any time.

Thus, the control of the black level is not limited as to the length of time and the number of times, so that the clamp circuit serves to achieve stability and high tracking ability.

Fifth Embodiment

Figure 13:
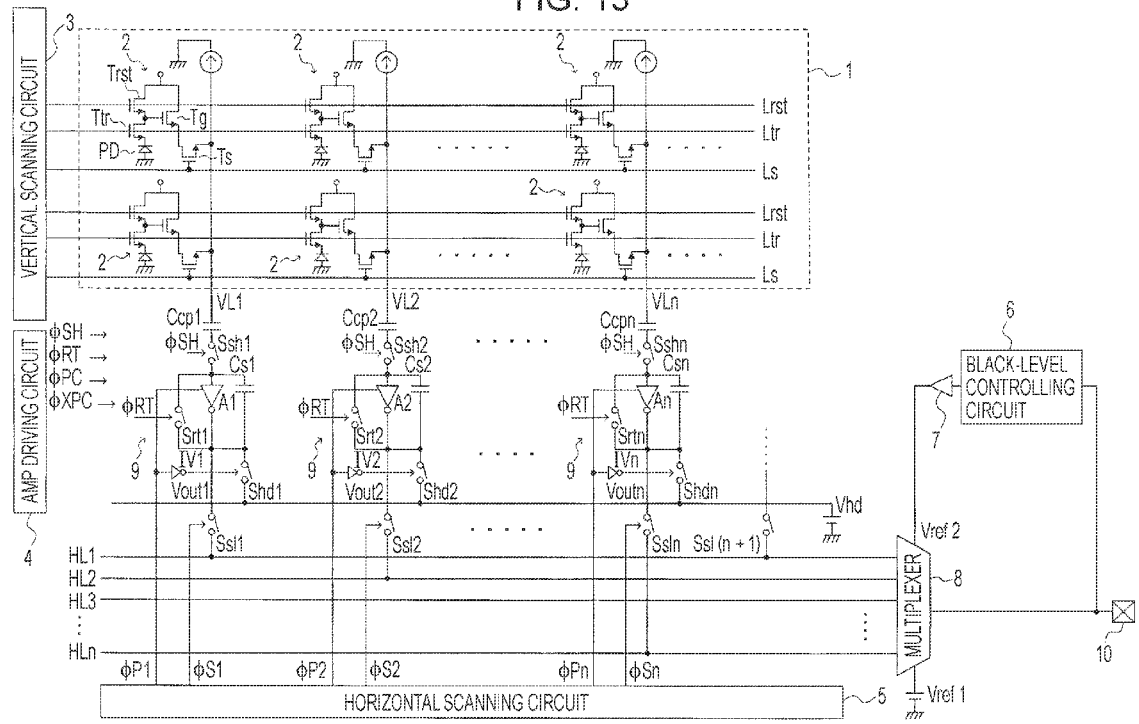
FIG. 13 is a diagram showing a construction according to a fifth embodiment of the present invention.
Figure 14:
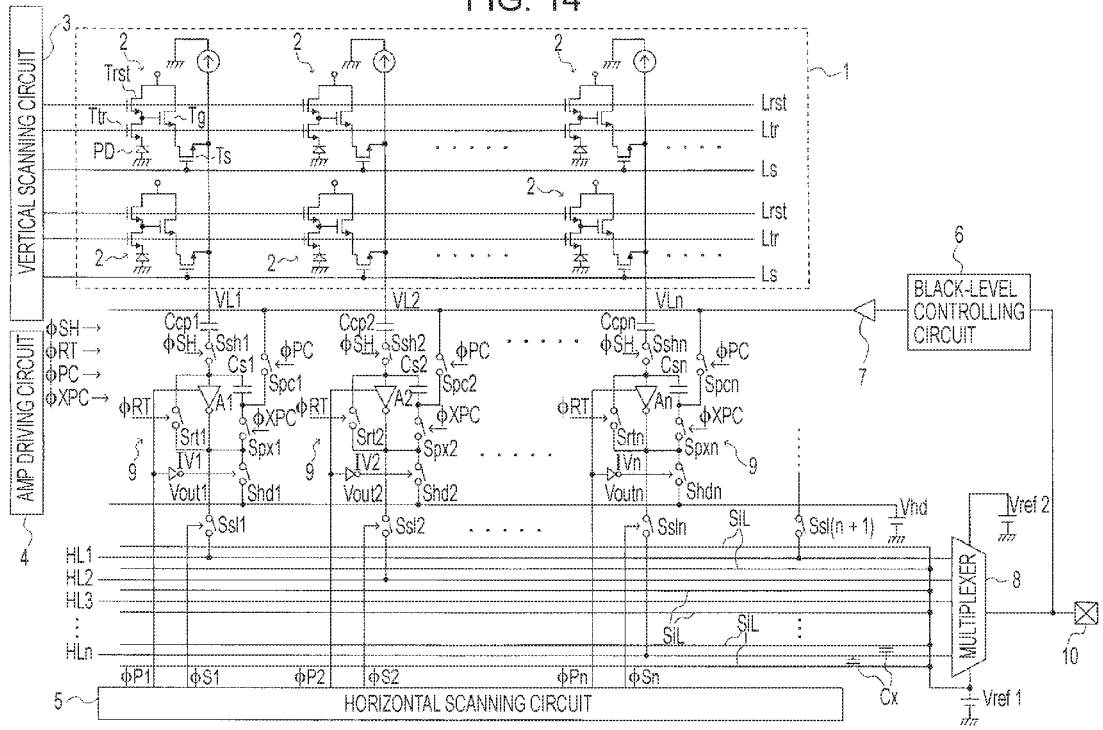
FIG. 14 is a diagram showing a construction according to a sixth embodiment of the present invention.

FIG. 13 shows a fifth embodiment of the present invention. In the fifth embodiment, similarly to the fourth embodiment shown in FIG. 12, the black-level controlling circuit 6 and the clamp-voltage outputting circuit 7 generate a clamp voltage, which is fed back to the reference voltage Vref2 of the multiplexer 8. In this case, since the black level need not be controlled by precharging the feedback capacitors Cs, the switches Spc and Spx and the reference potential VrefPC are omitted from the arrangement shown in FIG. 12. This kind of circuit configuration is feasible in some cases.

The operation of the circuit configured as described above is the same as that in the timing chart shown in FIG. 2 except in that the signals φPC and φXPC are omitted.

According to this embodiment, the circuit configuration is simplified. However, the output Vout expressed in equation (1) is expressed as:

$$V\text{out} = (Ccp/Cs)V\text{sig} + V\text{at} \quad (5)$$

so that the output Vout operates with reference to the threshold voltage Vat of the amp. Since the threshold voltages are expected to vary among the amps A on the respective columns, care must be taken in design.

Sixth Embodiment

In the embodiments described above, a plurality of horizontal signal lines HL is provided, so that coupling between the horizontal signal lines HL cause problems depending on layout. Furthermore, since long horizontal signal lines HL must be driven by amps A not having high driving ability, provided for the respective columns, presumably, impedance is high, and noise is likely to enter via stray capacitors or the like.

Thus, in the sixth embodiment, in order to overcome the problems described above, shield lines SiL are provided between the plurality of horizontal signal lines HL1 to HLn, and the shield lines SiL are coupled with the reference voltage Vref1 of the multiplexer 8.

That is, a shield line SiL is provided between each pair of horizontal signal lines HL to prevent coupling. Furthermore, the horizontal signal lines HL are coupled with the shield lines SiL by stray capacitors Cx, and the shield lines are connected to the reference voltage Vref1, so that the potential of the horizontal signal lines HL becomes equal to that of the capacitors Cm for sampling the horizontal signal lines HL, shown in FIG. 6. Thus, noise is prevented from entering via the stray capacitors Cx.

Modifications

Although the embodiments of the present invention have been described above, various modifications that fall within the scope of the present invention are possible.

The present invention has the following main features:

(1) Charge integrating amps provided for the respective columns enter the standby state while holding pixel signals that are read in a horizontal blanking period.

(2) In charge integrating amps provided for the respective columns, the reference potential for precharging feedback capacitors of amps at the time of a reading operation is automatically controlled based on the black level.

(3) Pixel signals are horizontally transferred from the respective charge integrating amps using a plurality of horizontal signal lines HL in parallel.

The present invention covers any arrangement having any one or any combination of the three features.

For example, when the arrangement shown in FIG. 1 is modified so that the number of horizontal signal lines HL is one and so that the multiplexer 8 is omitted, the modified arrangement has the features (1) and (2).

When the arrangement shown in FIG. 12 or the arrangement shown in FIG. 13 is modified so that the number of horizontal signal lines HL is one and so that the multiplexer 8 is omitted, the modified arrangement has the feature (1).

When the arrangement shown in FIG. 1 is omitted so that the black-level controlling circuit 6 and the clamp-voltage outputting amp 7 are omitted and so that precharging voltage is supplied at a fixed potential, the modified arrangement has the features (1) and (3).

The present invention can be implemented in various forms including the modifications described above.

Furthermore, although charge integrating amps are used to read signals from columns of vertical signal lines VL in the embodiments described above, the present invention is not limited to arrangements including charge integrating amps.

The method of transferring analog signals in such a manner that timings of driving a plurality of horizontal signal lines overlap each other with timing shifts of one clock is not limited to use in solid-state imaging devices according to the embodiments described above, and can be applied to other fields.

For example, when the parallel transfer according to the present invention is used to precisely and quickly read analog data from an array of rows or an array of rows and columns, such as an analog memory, precise and quick reading is allowed at low power consumption.

That is, when analog-signal holding elements for holding analog signals are provided along one or more rows in an analog memory device or the like, analog signals are output from the analog-signal holding elements to vertical signal lines of the respective columns, and the signal values of the analog-signal holding elements are read by amps provided for the respective columns.

Then, the analog signals held by the respective amps are assigned to a plurality of horizontal signal lines and are thereby transferred.

Figure 15:
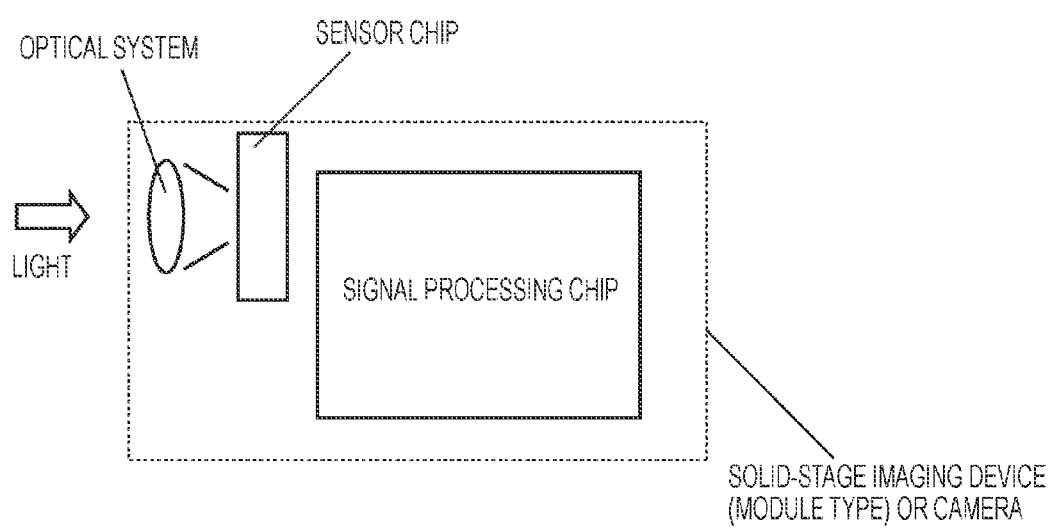
FIG. 15 is a diagram showing a module-type solid-state imaging device according to an embodiment of the present invention.
Figure 16:
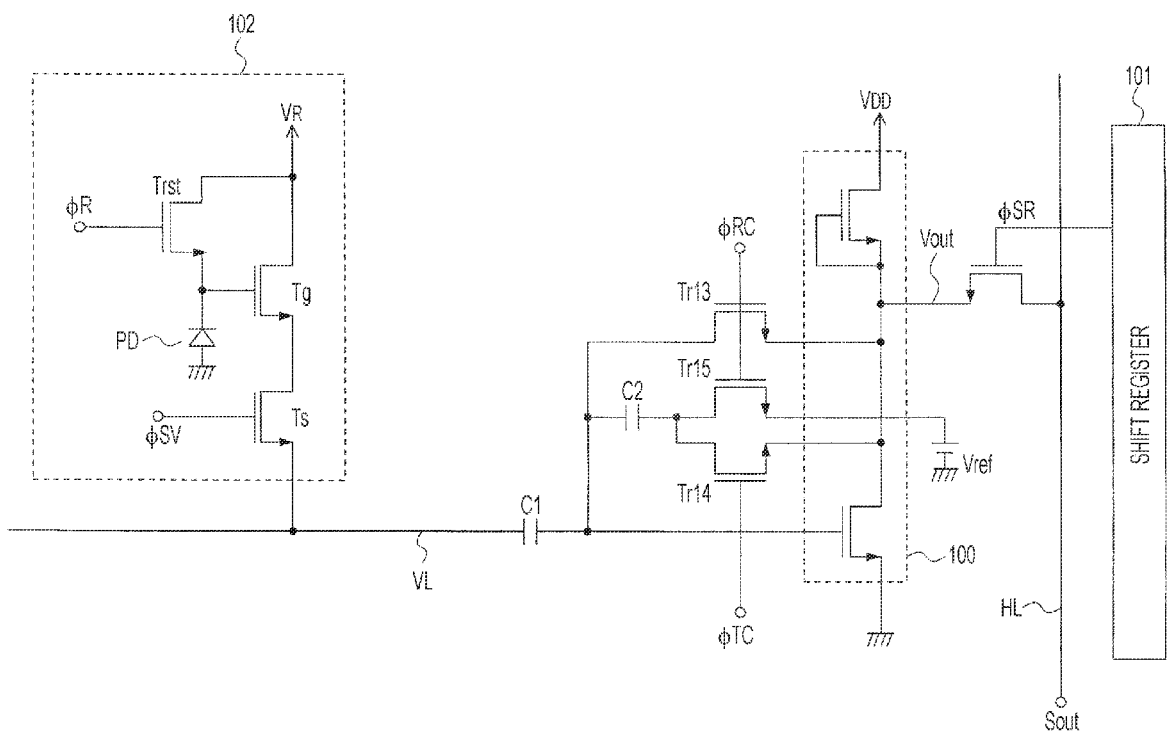
FIG. 16 is a diagram showing a construction according to a first related art.
Figure 18:
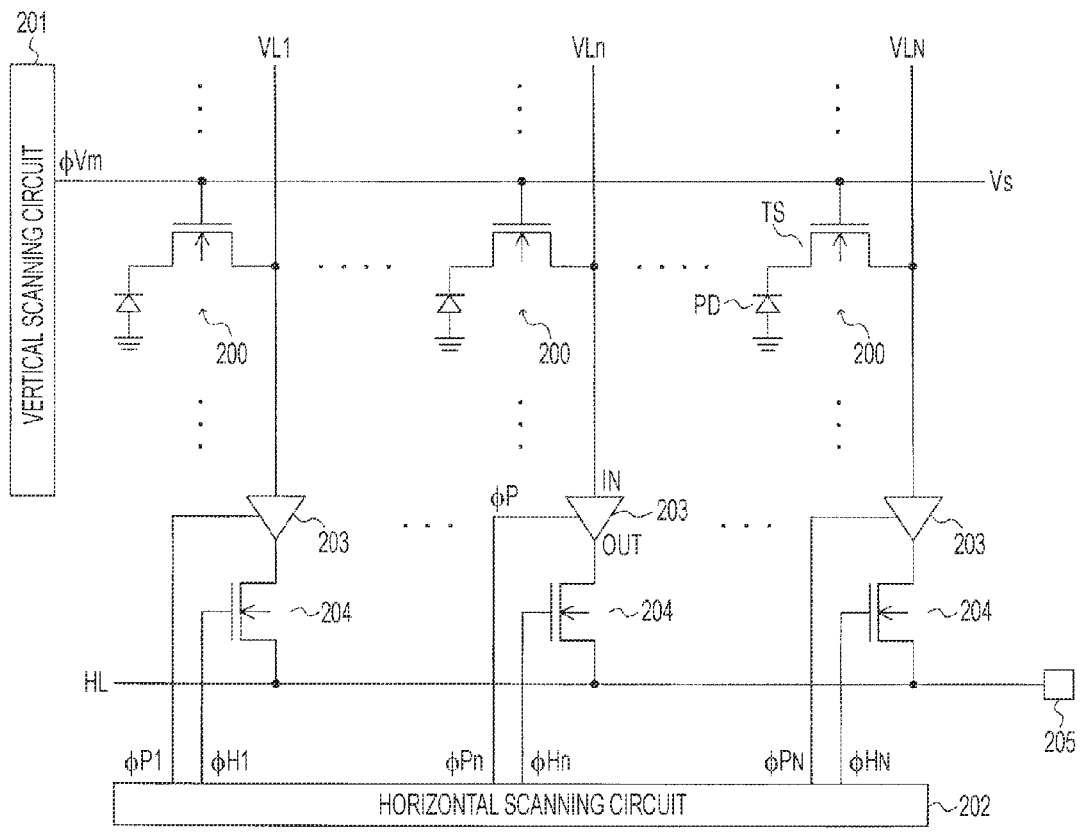
FIG. 18 is a diagram showing a construction according to a second related art.

A solid-state imaging device according to the present invention may be a solid-state imaging device implemented by a single chip or a module-type solid-state imaging device implemented by a set of chips. When a solid-state imaging device according to the present invention is implemented by a set of chips, a sensor chip for imaging, a signal processing chip for digital signal processing, and so forth, are provided separately, and an optical system is optionally included. An example construction is shown in FIG. 15.

In the description of the embodiments of the present invention, "row" and "column" indicating the arrangement of pixels or the direction of lines refer to a horizontal direction and a vertical direction of a matrix, respectively. However, the present invention is not limited to the arrangements of components described above. For example, signals may be read from pixels to the outside of an imaging region through signal lines extending in a horizontal direction. Furthermore, the directions of "row" and "column" depend on how "row" and "column" are defined. For example, when "row" indicates a vertical direction, the present invention is to be construed with "row" and "column" exchanged with each other.

Furthermore, even when pixels are not strictly arranged in a matrix form, for example, when pixels are arranged with shifts of half pitch, those skilled in the art can set "row" and "column" as appropriate and apply the present invention.

What is claimed is:

1. A solid-state imaging device comprising:
an imaging pixel region where a plurality of imaging pixels is disposed;
a vertical selecting circuit for outputting pixel signals from a plurality of imaging pixels of respective columns on a selected row of the imaging pixel region to a plurality of vertical signal lines provided respectively for the columns;
a plurality of amplifying units provided respectively for the vertical signal lines of the columns so as to receive inputs of pixel signals from imaging pixels of the respective columns;
a plurality of horizontal signal lines;
a horizontal selecting circuit for assigning pixel signals held by the amplifying units of the respective columns to the plurality of horizontal signal lines so that the pixel signals are transferred by the plurality of horizontal signal lines;
a multiplexer for sequentially selecting the plurality of horizontal signal lines to generate serial data including output pixel signals based on the pixel signals transferred by the plurality of horizontal signal lines; and
a reference-potential generating unit for generating a reference potential based on a black level of the pixel signals output through the horizontal signal lines,
wherein the reference potential is used as a reference potential for each of the amplifying units.

* * * * *